United States Patent
Worley et al.

(10) Patent No.: US 10,627,993 B2
(45) Date of Patent: Apr. 21, 2020

(54) INTERACTING WITH A CLIPBOARD STORE

(71) Applicant: Microsoft Technology Licensing, LLC, Redmond, WA (US)

(72) Inventors: Matthew Isaac Worley, Issaquah, WA (US); Chaitanya Dev Sareen, Seattle, WA (US); Christopher Doan, Seattle, WA (US); Jason Morris Yore, Seattle, WA (US); Apurva Jain, Redmond, WA (US); Richard Fang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 361 days.

(21) Appl. No.: 15/231,700

(22) Filed: Aug. 8, 2016

(65) Prior Publication Data
US 2018/0039385 A1 Feb. 8, 2018

(51) Int. Cl.
  *G06F 3/0482* (2013.01)
  *G06F 9/54* (2006.01)
  *G06F 3/0486* (2013.01)

(52) U.S. Cl.
  CPC .......... *G06F 3/0482* (2013.01); *G06F 3/0486* (2013.01); *G06F 9/543* (2013.01)

(58) Field of Classification Search
  CPC ................................ G06F 9/543; G06F 17/24
  See application file for complete search history.

(56) References Cited

U.S. PATENT DOCUMENTS

| 5,404,442 A | 4/1995 | Foster et al. |
| 5,924,099 A | 7/1999 | Guzak et al. |
| 6,309,305 B1 | 10/2001 | Kraft |

(Continued)

FOREIGN PATENT DOCUMENTS

| EP | 2618250 A2 | 7/2013 |
| WO | 2000073902 A1 | 12/2000 |

(Continued)

OTHER PUBLICATIONS

Microsoft Computer Dictionary, 2002, Microsoft Press, Fifth Edition, p. 129 (Year: 2002).*

(Continued)

*Primary Examiner* — Nicholas Klicos
(74) *Attorney, Agent, or Firm* — Rainier Patents, P.S.

(57) ABSTRACT

A clipboard component provides a multi-item clipboard store. The clipboard component uses a technical strategy that facilitates its efficient adoption and use by end users and application developers. From an end user's standpoint, the clipboard component provides a new user experience which is easy for the users to discover, learn and use, due, in part, to the use of ergonomic control mechanisms for activating paste and copy operations. From a developer's standpoint, the clipboard component provides a way of allowing existing legacy applications to interact with a multi-item clipboard store, even though these applications were not originally created to provide that type of interaction. The clipboard component can also, upon instruction by a user, apply one or more supplemental operations to a copied content item, such as transferring the item to a target computing device.

21 Claims, 14 Drawing Sheets

(56) References Cited

U.S. PATENT DOCUMENTS

| | | | |
|---|---|---|---|
| 6,944,821 B1 | 9/2005 | Bates et al. | |
| 7,496,853 B2 | 2/2009 | Awada et al. | |
| 7,950,066 B1* | 5/2011 | Zuili | G06F 21/6281 |
| | | | 713/165 |
| 8,020,112 B2 | 9/2011 | Ozzie et al. | |
| 8,555,187 B2 | 10/2013 | Margolin | |
| 9,003,283 B2 | 4/2015 | Xu | |
| 9,069,432 B2 | 6/2015 | Eylon | |
| 9,092,121 B2 | 7/2015 | Albouyeh et al. | |
| 9,098,713 B2 | 8/2015 | Lee | |
| 9,128,784 B2 | 9/2015 | Glasgow et al. | |
| 9,135,229 B2 | 9/2015 | Commarford et al. | |
| 9,189,645 B2 | 11/2015 | Borzycki et al. | |
| 2004/0217987 A1 | 11/2004 | Aran | |
| 2004/0226012 A1* | 11/2004 | Awada | G06F 3/04842 |
| | | | 718/100 |
| 2005/0066335 A1* | 3/2005 | Aarts | G06F 9/543 |
| | | | 719/316 |
| 2005/0102629 A1* | 5/2005 | Chen | G06F 3/0481 |
| | | | 715/770 |
| 2005/0172241 A1* | 8/2005 | Daniels | G06F 3/0482 |
| | | | 715/770 |
| 2005/0203935 A1 | 9/2005 | McArdle | |
| 2005/0289133 A1 | 12/2005 | Arrouye et al. | |
| 2006/0218492 A1 | 9/2006 | Andrade | |
| 2007/0061747 A1 | 3/2007 | Hahn et al. | |
| 2008/0082932 A1* | 4/2008 | Beumer | G06F 9/543 |
| | | | 715/770 |
| 2008/0109464 A1 | 5/2008 | Ozzie et al. | |
| 2008/0229219 A1 | 9/2008 | Muguda | |
| 2008/0306986 A1* | 12/2008 | Doyle, Sr. | G06F 8/51 |
| 2009/0024947 A1* | 1/2009 | Marion | G06F 9/451 |
| | | | 715/770 |
| 2009/0100503 A1 | 4/2009 | Doyle | |
| 2009/0144368 A1 | 6/2009 | Andersen | |
| 2009/0187842 A1* | 7/2009 | Collins | G06F 3/0482 |
| | | | 715/769 |
| 2011/0126092 A1 | 5/2011 | Harris | |
| 2012/0096368 A1* | 4/2012 | McDowell | G06F 9/543 |
| | | | 715/748 |
| 2012/0110486 A1* | 5/2012 | Sirpal | G06F 9/543 |
| | | | 715/770 |
| 2012/0139923 A1* | 6/2012 | Bangfei | G06F 9/541 |
| | | | 345/473 |
| 2012/0246594 A1* | 9/2012 | Han | G06F 3/0486 |
| | | | 715/790 |
| 2013/0036167 A1 | 2/2013 | Bazot et al. | |
| 2013/0117840 A1 | 5/2013 | Roesner et al. | |
| 2013/0191769 A1* | 7/2013 | Park | G06F 3/0488 |
| | | | 715/770 |
| 2013/0339889 A1 | 12/2013 | Bastide et al. | |
| 2014/0013258 A1* | 1/2014 | Jang | G06F 3/0488 |
| | | | 715/770 |
| 2014/0095673 A1 | 4/2014 | Mao et al. | |
| 2014/0157169 A1 | 6/2014 | Kikin-gil | |
| 2014/0215372 A1 | 7/2014 | Reissman et al. | |
| 2014/0244653 A1* | 8/2014 | Plotkin | G06Q 10/06311 |
| | | | 707/741 |
| 2014/0247210 A1 | 9/2014 | Henderek et al. | |
| 2014/0267339 A1 | 9/2014 | Dowd et al. | |
| 2014/0324943 A1 | 10/2014 | Antipa | |
| 2015/0012861 A1* | 1/2015 | Loginov | G06F 9/543 |
| | | | 715/770 |
| 2015/0026549 A1* | 1/2015 | Shao | G06F 17/2247 |
| | | | 715/205 |
| 2015/0067534 A1* | 3/2015 | Choi | G06F 3/0482 |
| | | | 715/752 |
| 2015/0153921 A1* | 6/2015 | Dou | G06F 3/0486 |
| | | | 715/760 |
| 2015/0207850 A1* | 7/2015 | Jitkoff | H04L 67/06 |
| | | | 715/748 |
| 2015/0310220 A1* | 10/2015 | Brooks | G06F 21/606 |
| | | | 713/189 |
| 2016/0132307 A1* | 5/2016 | Muldoon | G06F 8/51 |
| | | | 717/137 |
| 2016/0154686 A1* | 6/2016 | Huang | G06F 3/0488 |
| | | | 715/770 |
| 2016/0246484 A1* | 8/2016 | Kim | G06F 3/04817 |
| 2016/0274771 A1* | 9/2016 | Seong | G06F 3/048 |

FOREIGN PATENT DOCUMENTS

| | | |
|---|---|---|
| WO | 2012128548 A1 | 9/2012 |
| WO | 2013144807 A1 | 10/2013 |

OTHER PUBLICATIONS

Viticci, Federico, "Copied: A Full-Featured Clipboard Manager for iOS 9," available at <<https://www.macstories.net/reviews/copied-a-full-featured-clipboard-manager-for-ios-9/>>, MacStories, published on Dec. 16, 2015, 7 pages.

Schmidt, et al., "Personal Clipboards for Individual Copy-and-Paste on Shared Multi-User Surfaces," in Proceedings of the SIGCHI Conference on Human Factors in Computing Systems, Apr. 2013, 10 pages.

Liljenberg, Peter, "Copy-paste conclusions: put the metadata on the clipboard," available at <<http://commonsmachinery.se/2013/10/copy-paste-conclusions-put-the-metadata-on-the-clipboard/>>, Commons Machinery, published on Oct. 24, 2013, 6 pages.

"Add-ons," available at <<https://addons.mozilla.org/en-US/firefox/addon/copy-rdfa-metadata/>>, Mozilla, retrieved on Jul. 17, 2016, 2 pages.

Steen, Hallvord R. M., "embedding meta data for copy/paste usages—possible use case for RDF-in-HTML?," available at <<http://whatwg.whatwg.narkive.com/mMTqVxHD/embedding-meta-data-for-copy-paste-usages-possible-use-case-forrdf-in-html, Narkive Mailinglist Archive, retrieved on Aug. 8, 2016, 10 pages.

Hassan, Mehedi, "Hands-on with Microsoft OneClip on Windows 10, Windows Mobile and Android," available at <<http://microsoft-news.com/hands-on-with-microsoft-oneclip-on-windows-10-and-android/>>, MSPoweruser, published on May 22, 2015, 13 pages.

Morris, Paul, "Sync Clipboard Between Your Android Device and Windows PC Over Wi-Fi With ClipSync," available at <<http://www.redmondpie.com/sync-clipboard-between-your-android-device-and-windows-pc-over-wi-fi-with-clipsync/>>, Redmond Pie, published on Aug. 14, 2012, 5 pages.

Reif, et al., "Semantic Clipboard-Semantically Enriched Data Exchange Between Desktop Applications," in the Proceedings of the 5th International Semantic Web Conference, Nov. 2006, 14 pages.

Oldenburg, Ryan, "Introducing Universal Copy & Paste," available at <<https://blog.pushbullet.com/2014/08/20/introducing-universal-copy-and-paste/>>, Pushbullet blog, published on Aug. 20, 2014, 6 pages.

"Kingsoft Office X Plats 1.4—One-click to share your clipboard," available at <<http://www.kingsoftstore.com/clip-for-android>>, Kingsoft Softwart, retrieved on Feb. 16, 2016, 2 pages.

"How to: Retrieve Data from the Clipboard," available at <<https://msdn.microsoft.com/en-us/library/c2thcsx4(v=vs.110).aspx>>, Microsoft Developer Network, Microsoft Corporation, Redmond, WA, retrieved on Jul. 17, 2016, 4 pages.

Kimmatkar, Sarang B., "Extending functionalities of default clipboard," in International Journal of Computer Science and Information Technologies, vol. 5, Issue 6, Dec. 2014, 4 pages.

Rodent, Herman, "Supporting the Clipboard, DDE, and OLE in Applications," available at <<https://msdn.microsoft.com/en-us/library/ms997518.aspx>>, Microsoft Developer Network, Microsoft Corporation, Redmond, WA, published on Sep. 24, 1992, 13 pages.

"International Search Report and Written Opinion Issued in PCT Application No. PCT/US2017/044776", dated Nov. 7, 2017, 15 Pages.

(56) References Cited

OTHER PUBLICATIONS

Pierce, David, "With iOS 10, Your iPhone's Basically Just a Lockscreen Now", Retrieved from <<https://www.wired.com/2016/07/ios-10-iphones-basically-just-lockscreen-now/>>, Jul. 7, 2016, 7 Pages.

* cited by examiner

INTERACTING WITH A CLIPBOARD STORE

BACKGROUND

A traditional single-item clipboard stores a single most-recently copied content item. The clipboard retrieves that content item when the user activates a paste command. A multi-item clipboard, on the other hand, can store plural content items. While a multi-item clipboard is more versatile than a traditional clipboard, it is also more complex; this complexity introduces various technical challenges, both in the design of the multi-item clipboard, as well as the mechanisms by which applications interact with the multi-item clipboard.

SUMMARY

A clipboard component is described herein that provides a multi-item clipboard store. The clipboard component uses a technical strategy that facilitates its efficient adoption and use by end users and application developers. From an end user's standpoint, the clipboard component provides a new user experience which is easy for the users to discover, learn and use, due, in part, to the use of ergonomic control mechanisms for activating paste and copy operations. From a developer's standpoint, the clipboard component provides a way of allowing existing applications (referred to herein as legacy applications) to interact with the multi-item clipboard store, even though these applications were not originally created to provide that type of interaction.

According to another illustrative aspect, the clipboard component expands a user's options upon saving a content item to a single-item or multi-item clipboard store. Each option, which corresponds to a particular copy mode, applies one or more processing operations to a selected content item. For example, for one copy mode, the clipboard component transfers a selected content item to a target computing device.

The above clipboard functionality can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
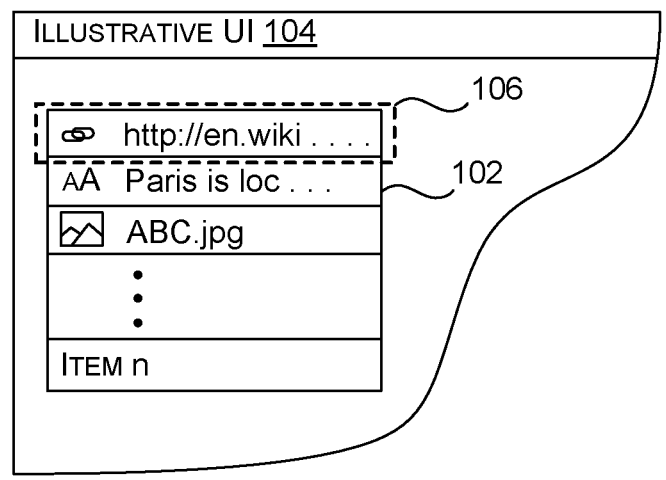
FIG. 1 shows an illustrative user experience by which a user may perform a paste operation using a multi-item clipboard store.
Figure 1:
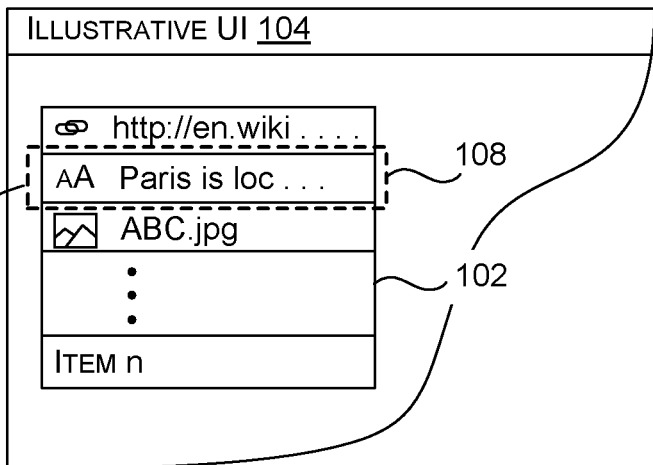
Figure 1:
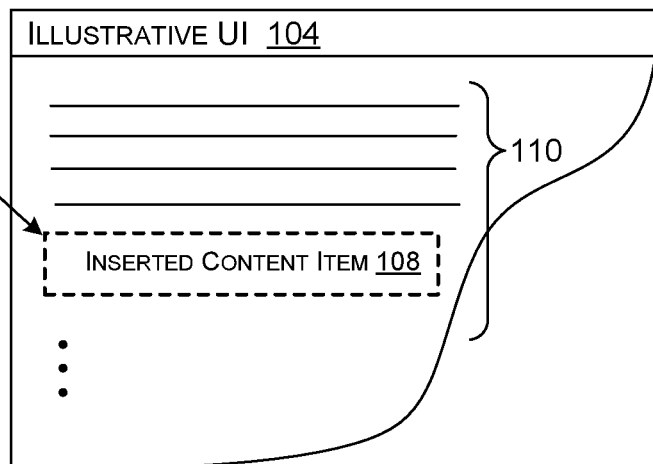

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative user experiences by which a user can perform paste and copy operations using a multi-item clipboard store, and, in some cases, a single-item clipboard store. Section B describes illustrative system components that can provide the user experiences shown in Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

The term "gesture" refers to any characteristic action by which a user provides input to a computing device. In one case, a user may make a gesture by activating one or more hard keys in a prescribed manner. In another case, a user may make a gesture by performing one or more touch gestures (e.g., taps, pans, scrolls, flicks, etc.) on a touch-sensitive surface. In another case, a user may make a gesture by moving the computing device in a prescribed manner, and so on. Still other gestures can involve a combination of different categories of actions, such as actuation of a hard key and a touch gesture.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative User Experiences

This section describes various illustrative user interface workflows by which a user may interact with a clipboard component provided by a computing device. In some implementations, the clipboard component provides a multi-item clipboard store that is capable of storing plural content items, supplied by one or more applications. In other implementations, the clipboard component can use either a multi-item clipboard store or a single-item clipboard store in performing at least some of the operations (such as the copy-related operations). Section B will describe different implementations of the workflows described in this section.

FIG. 1 shows an illustrative user experience by which a user may perform a paste operation using a clipboard component provided by a computing device. At a juncture labeled in FIG. 1 as "A," assume that an end user is in the process of interacting with a particular application that performs any function. Further assume that the application provides a target work item (e.g., a target graphical window) on the computing device's graphical user interface (GUI), through which the user interacts with the particular application. Further assume that the user wishes to paste a content item from a multi-item clipboard store into the target work item.

To perform this task, the user performs a user interface (UI) activation gesture. For example, without limitation, the user performs the UI-activation gesture by simultaneously pressing a control ("Ctrl") key and a "V" character key of a key input device for more than a prescribed amount of time (e.g., more than 3 seconds). In response, the clipboard component displays a multi-option UI presentation 102 on the computing device's GUI. For instance, the computing device can display the multi-option UI presentation 102 overlaid on a target UI presentation 104 (e.g., corresponding to the target work item), with which the user is currently interacting. Or the clipboard component can display the multi-option UI presentation 102 on some other region of the computing device's GUI, such as a peripheral region of the GUI. (In another implementation, described more fully at the end of this section, the clipboard component starts a timer when the user first presses the control key and the V key. The clipboard component will thereafter present the multi-option UI presentation when the user continues to hold down the control key for more than the prescribed amount of time, irrespective of whether the user continues to hold down the V key.)

The multi-option UI presentation 102 presents plural options which respectively represent the current content items stored in the multi-item clipboard store. For example, a first content item 106 represents a link that the user has copied using a first application. A second content item represents a piece of text that the user has copied using a second application. A third content item represents an image that the user has created using a third application. More generally, the clipboard component can store any number of content items created by any number of applications. For instance, in another scenario, the multi-item clipboard store can store up to n content items created by the same application. Upon first activating the multi-option UI presentation 102, the clipboard component can highlight the first (topmost) content item 106 in any manner, e.g., by changing its visual appearance in any way, or by displaying an icon adjacent to it, and so on.

As a default, the clipboard component stores the content items in the multi-item clipboard store in the order in which they were copied into it. That is, the clipboard component stores each new content item in its topmost slot, pushing all other content item down by one slot in the stack, and pushing the $n^{th}$ content item off the stack. As a default, therefore, the topmost slot stores the most recently copied content item.

But as will be made clear in Section B, the clipboard component can also modify the order of the content items in the multi-item clipboard store, such that the order does not necessarily always reflect the temporal order in which content items were copied. Further note that the term "top" refers to a slot in the multi-item clipboard store that is first in a given sequence of entries in some data structure; it does not necessarily refer to a particular physical position of a slot.

Note that, in one implementation, the UI-activation gesture is a variation of a traditional paste gesture. More specifically, many traditional clipboard components allow a user to paste a content item to a single-item clipboard store by pressing a control key and a V key at the same time. In the present case, the clipboard component interprets the simultaneous activation of a control key and a V key in different ways, depending on how long the user simultaneously presses these two keys. When the user presses these two keys for more than a prescribed amount of time, the clipboard component will display the multi-option UI presentation 102. When the user presses these two keys for less than (or equal to) the prescribed amount of time, and then subsequently releases the keys, the clipboard component will retrieve the topmost content item in the multi-item clipboard store and deliver it to the application for pasting into the target work item. In other words, the user can duplicate a traditional paste gesture by quickly pressing the control key and V key at the same time. As will be described at the end of this section, other implementations can use other gestures to generate triggering events.

At juncture "B," the user performs an option-selection gesture by holding down the control key and then repeating the activation of the V key. FIG. 1 represents this action as Ctrl+V+V, meaning that the user initially presses the control key and the V key, and then, while continuing to hold down the control key, releases the V key and then presses it down again. In response to this gesture, the clipboard component selects a second content item 108. The clipboard component can change the highlighting in the multi-option UI presentation 102 to indicate this choice, e.g., such that the second content item 108 is now highlighted, rather than the first content item 106.

Although not shown, the user can repeat the above-described option-selection gesture one or more times to successively move through the content items in the multi-option UI presentation 102. For example, while holding the control key down, the user can release the V key and then press it down again. This causes the clipboard component to advance to the third content item in the multi-item clipboard store. In other words, note that the option-selection gesture constitutes a base gesture (simultaneously pressing the control key and the V key) that the user can repeat zero, one or more times by pressing the V key zero, one or more additional times.

At a juncture labeled "C," assume that the user now releases the control key. In response, the clipboard sends the second content item 108 to the particular application. The particular application then pastes the second content item 108 into a work area 110 designated by the user.

In another implementation (not shown), the clipboard component can allow a user to select plural content items in the multi-option UI presentation 102, such as the first and second content items. Upon a paste command, the clipboard component will concatenate the selected content items into a single item, and then paste the single item into a target work item.

Overall, the above-described UI-activation gesture and option-selection gesture have various advantages. For instance, a user can easily discover and learn these gestures because they constitute extensions of a default Ctrl+V gesture with which the user may already be familiar. Further, the control strategy is ergonomic in in nature because the user can easily and quickly perform the series of gestures shown in FIG. 1, e.g., because the gestures involve the activation of the same two keys. More specifically, the user is not expected to remember a set of widely dissimilar gestures to perform the actions described above. Further, the user is not required to move his or fingers from the control key and the V key to perform these gestures. Nevertheless, as described below, other implementations can use other keys (and/or other user interface control mechanisms) and/or activation patterns to perform the UI-activation gesture and/or the option-selection gesture, compared to the actions described above. In general, many of these options allow the user to use a same set of control mechanisms to activate both the multi-option UI presentation 102 and select an option within the multi-option UI presentation 102.

Figure 2:
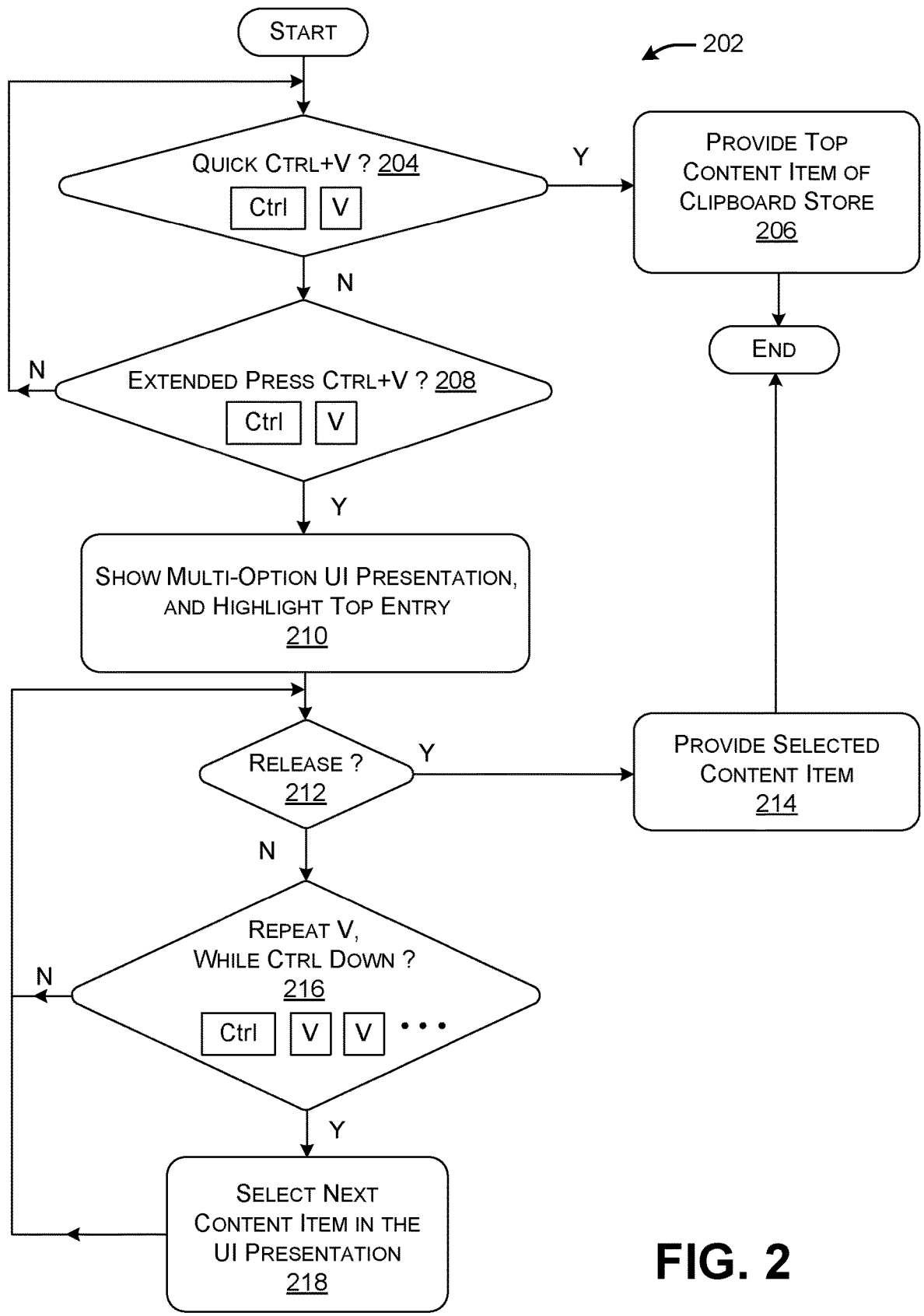
FIG. 2 is a flowchart which describes the operations in the user experience shown in FIG. 1.

FIG. 2 shows a process 202 which summarizes the workflow described in FIG. 1. In block 204, the clipboard component determines whether the user has activated the control key and the V key for less than (or equal to) a prescribed amount of time, followed by releasing these keys. If so, in block 206, the clipboard component provides the topmost content item in its multi-item clipboard store to the particular application with which the user is interacting.

Alternatively, in block 208, the clipboard component determines whether the user has activated the control key and the V key for more than the prescribed amount of time. If so, in block 210, the clipboard component displays the multi-option UI presentation 102 shown in FIG. 1. Initially, the clipboard component highlights the first content item 106 in the multi-option UI presentation 102 to indicate that this item is the currently selected item.

In block 212, the clipboard component determines whether the user has released the control key. If so, in block 214, the clipboard component retrieves the currently selected content item and delivers it to the application.

In block 216, the clipboard component determines whether the user has instead activated the V key at least one more time, while holding the control key down. If so, in block 218, the clipboard component selects a next content item in the multi-item clipboard store. Control then returns to block 212, where the clipboard component again determines whether the user has released the control key.

Figure 3:
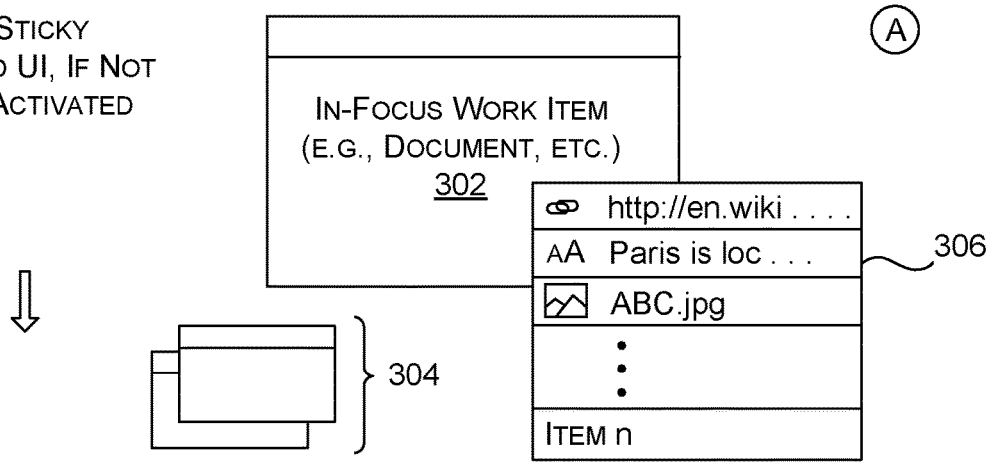
FIG. 3 shows another illustrative user experience by which a user may perform a paste operation using a multi-item clipboard store.
Figure 3:
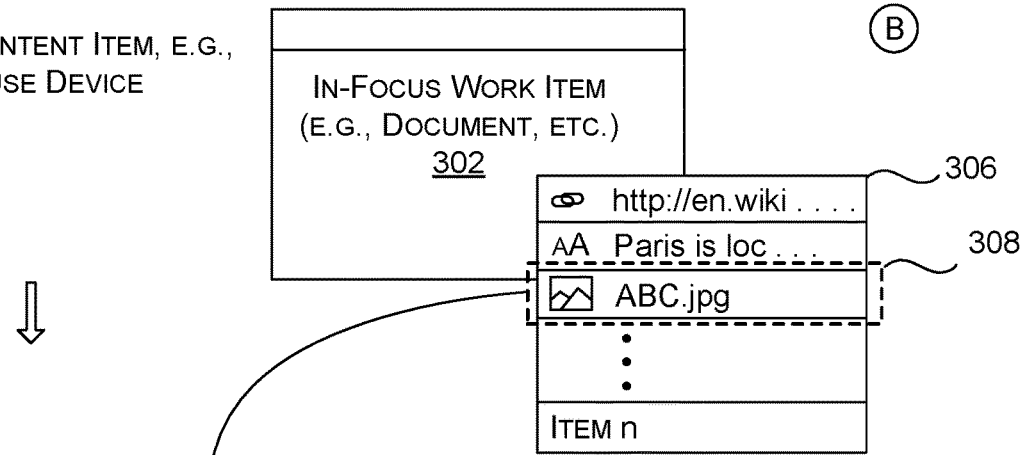
Figure 3:
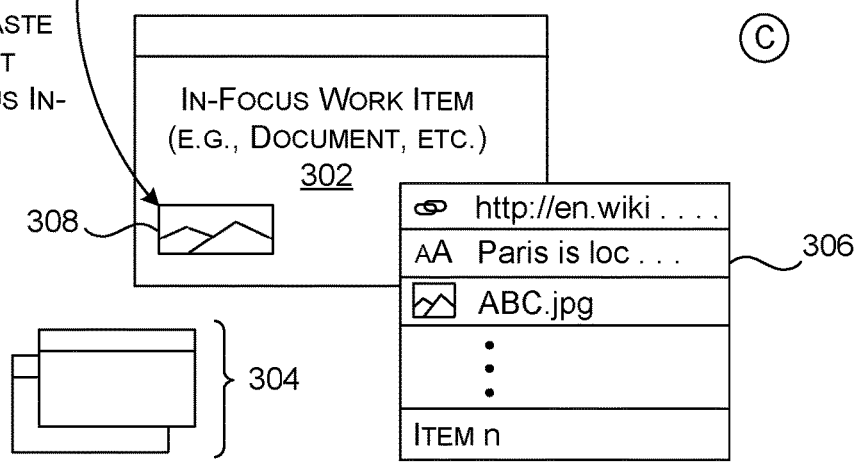

FIG. 3 shows another illustrative user experience by which a user may perform a paste operation using a multi-item clipboard store. At juncture "A," assume that the user is interacting with an in-focus work item 302. For instance, assume that the user is interacting with a word processing application to create a document, wherein that word processing application provides the in-focus work item 302 (e.g., a graphical window) which presents the document. A computing device's GUI may also optionally host one or more other work items 304; but these work items 304 are not in-focus work items because they are not receiving the current attention of the user.

Next, assume that the user moves his or her focus to a multi-option UI presentation 306. In one implementation, the clipboard component may display the multi-option UI presentation 306 as a static feature of the computing device's GUI. For example, the clipboard component can display the multi-option UI presentation 306 in a peripheral region of the GUI. In another implementation, the clipboard component can present the multi-option UI presentation 306 when the user performs some action to activate it. For example, the clipboard component can activate the multi-option UI presentation when the user moves to a tool bar region of the GUI (not shown) and activates an icon (not shown) associated with the multi-option UI presentation. In either of the above display scenarios, the multi-option UI presentation 306 can be regarded as "sticky" because the clipboard component displays it on a more permanent basis compared to the workflow of FIG. 1.

The multi-option UI presentation 306 itself has the same composition as that described above with reference to FIG. 1. That is, the multi-option UI presentation 306 provides a visual representation of up to n content items provided in a multi-item clipboard store.

At juncture "B," the user engages the multi-option UI presentation 306 to select a particular content item 308. For instance, the user may use a mouse device or touch gesture (on a touch-sensitive surface) to point to and select the particular content item 308. The user may also use a mouse device or touch gesture to scroll within the multi-option UI presentation 306.

At juncture "C," the clipboard component works in combination with the word processing application to paste the selected content item 308 into the target work item 302. The clipboard component and the application perform this function in an automatic manner in response to the user's selection of the content item 308. To perform this task, the clipboard component automatically determines the work item with which the user was previously interacting, corresponding to the in-focus work item 302, as opposed to the other work items 304 that may be active on the computing device's GUI, but with which the user was not most recently interacting. More explicitly stated, the clipboard component automatically performs the paste operation after the user's selection of a content item because the user is not required to manually designate the in-focus work item 302 and then manually execute a separate paste gesture. The application which provides the in-focus work item 302 can paste the selected content item into the in-focus work item 302 at a location that was last registered by the user, in the course of the user's interaction with the in-focus work item 302. That location can be stored by the application, and/or the computing device's operating system, etc.

Note that, while the workflow shown in FIG. 3 offers a different user experience compared to the workflow shown in FIG. 1, the clipboard component can leverage the same technical solution to implement both workflows. Section B provides an explanation of that technical solution.

Figure 4:
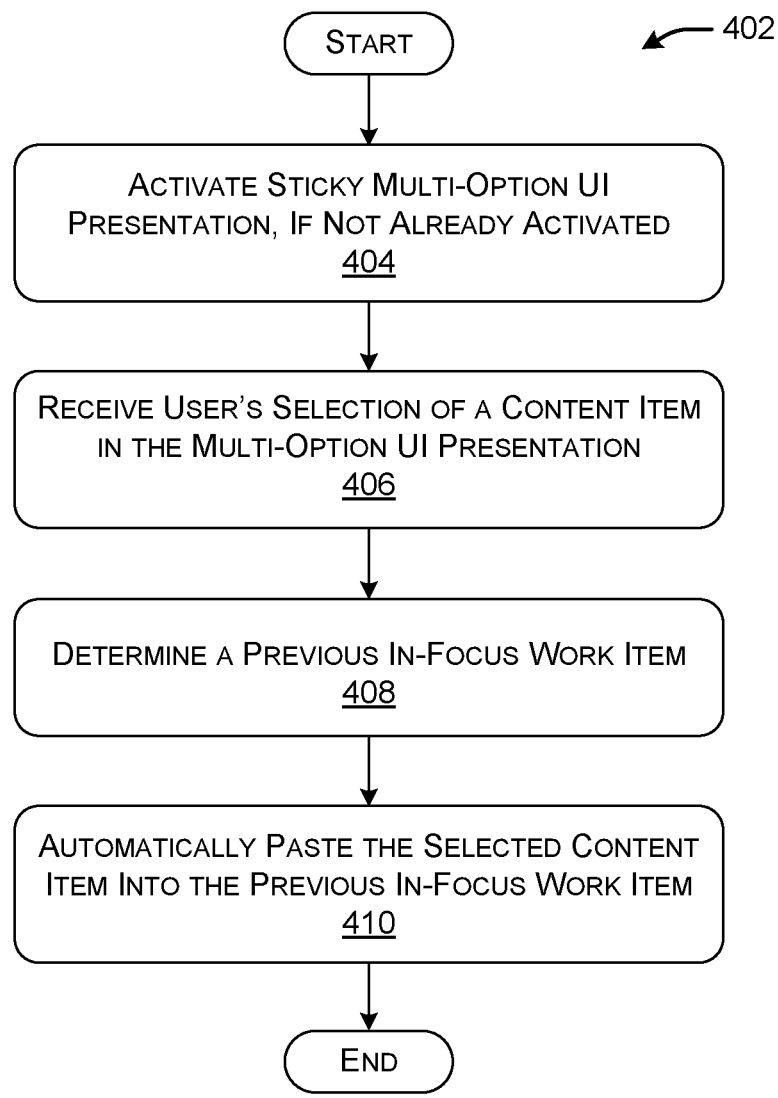
FIG. 4 is a flowchart which describes the operations in the user experience shown in FIG. 3.

FIG. 4 shows a process 402 which summarizes the workflow described in FIG. 3. In block 404, the clipboard component activates the "sticky" multi-option UI presentation 306 on the computing device's GUI, if not already activated. In block 406, the clipboard component receives a user's selection of a content item in the multi-option UI presentation 306. In block 408, the clipboard component determines the target work item with which the user was previously interacting, before interacting with the multi-option UI presentation 306; that target work item is also referred to herein as the previous in-focus work item. In block 410, the clipboard component in conjunction with a particular application (that provides the in-focus work item) automatically pastes the selected content item into the in-focus work item without requiring other user interface actions by the user.

Figure 5:
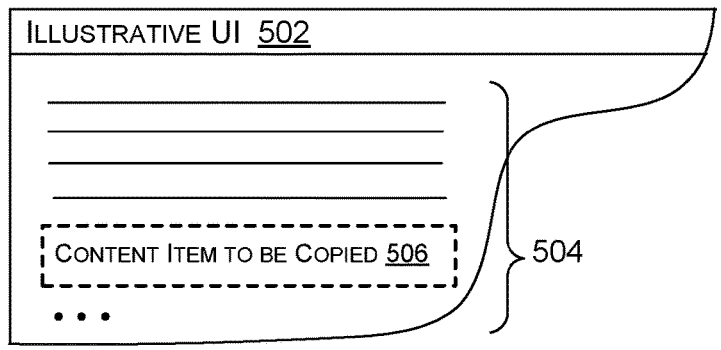
FIG. 5 shows an illustrative user experience by which a user may perform a copy operation.
Figure 5:
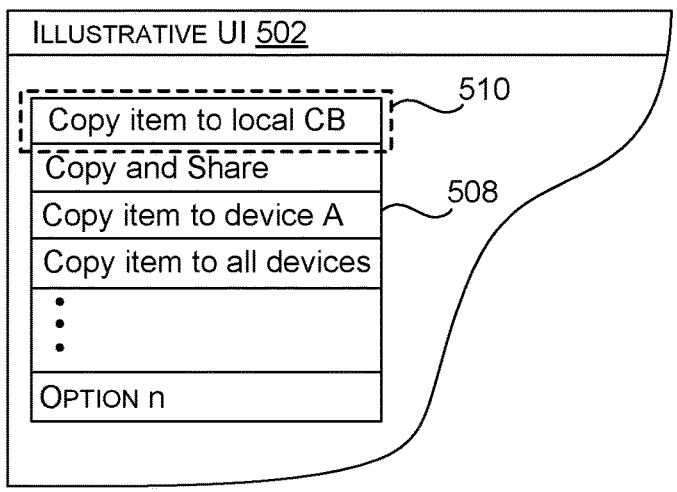
Figure 5:
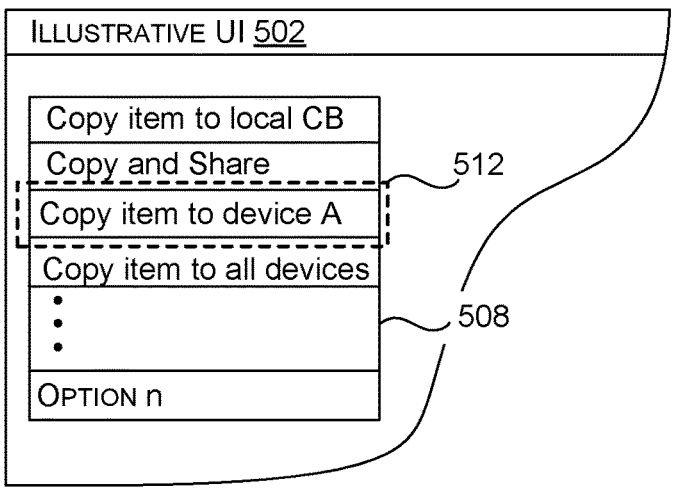

FIG. 5 shows an illustrative user experience by which a user may perform a copy operation. To facilitate explanation, the workflow of FIG. 5 is described as applying to a multi-item clipboard store. But many aspects of the workflow can also be beneficially applied to a clipboard component that provides a single-item clipboard store.

At juncture "A," assume that the user is interacting with a work item 502 of any type. For example, assume that the user is reading a document 504 displayed by a browser application. Further assume that the user selects a content item 506 in the document 504, e.g., corresponding to a text snippet, email address, image, etc. provided by the document 504. The user may make this selection in any manner, e.g., by highlighting the content item 506 using a mouse device or touch gesture performed on a touch-sensitive surface.

At juncture "B," assume that the user next simultaneously presses a control key and a "C" character key for more than a prescribed amount of time. In response, the clipboard component displays a multi-option UI presentation 508. The clipboard component can present the multi-option UI presentation 508 such that it overlaps the work item 502. Or the clipboard component can present the multi-option UI presentation 508 in any other display region of the computing device's GUI.

The multi-option UI presentation 508 presents a visual representation of different copy modes. Each copy mode describes one or more processing operations that the clipboard component will apply to the selected content item 506. In other words, in the context of the paste operation of FIG. 1, the multi-option UI presentation 102 presents a list of content items stored in a multi-item clipboard store. In the case of the copy operation described in FIG. 5, the multi-option UI presentation 508 displays different processing techniques that may be applied to the selected content item 506.

The UI-activation gesture shown in FIG. 5 offers the same user experience as the UI-activation gesture described with reference to FIG. 1. For instance, when the user simultaneously presses the control key and the C key for less than (or equal to) a prescribed amount of time, the clipboard component will perform a default copy operation, e.g., by adding the selected content item 506 to the top slot of the clipboard store, without performing any additional actions to the selected content item 506.

Different implementations can offer different copy modes for selection. A first copy mode 510 offers the user the option to perform an unembellished copy operation, that is, by copying the selected content item 506 to the topmost slot of the multi-item clipboard store. Incidentally, this is the same operation that is invoked when the user quickly presses the control key and the C key.

A second copy mode involves a copy-and-share operation. Upon selecting this option, the clipboard component provides a UI presentation (not shown) that invites the user to share the selected content item 506 with one or more target users, via one or more target sharing sites, via one or more target modes. For example, the UI presentation can invite the user to post the selected content item 506 to a social network site. Alternatively, or in addition, the UI presentation can invite the user to transmit the selected content item 506 as a message to any particular target user or a group of target users. The second copy mode can also optionally involve copying the selected content item 506 to the local multi-item clipboard store. In other words, the second copy mode can perform a content-sharing operation together with the default copy operation performed by the first copy mode 510.

A third copy mode involves a cross-device transfer operation. Upon selecting this option, the local clipboard component will transfer the selected content item 506 from a source computing device (which has been used to select the content item 506) to a particular target computing device. In one implementation, the target computing device corresponds to another user computing device affiliated with the current user (who is performing the selecting operation). For example, the user may select the content item 506 using a smartphone, and then invoke the third copy mode to transfer the selected content item 506 to his or her desktop personal computing device. More generally, the target computing device need not be affiliated with the user who is performing the copy operation, and need not correspond to a user computing device. Upon receipt, the recipient target computing device can store the selected content item 506 in its own local multi-item clipboard store. The second copy mode can also involve copying the selected content item 506 to the local multi-item clipboard store of the source computing device.

A fourth copy mode shows another cross-device transfer operation. Upon selecting this option, the local clipboard component will transfer the selected content item 506 from the source computing device (which has been used to select the content item 506) to plural target computing devices. For example, the fourth copy mode can involve sending the selected content item 506 to all of the user computing devices affiliated with the user. That is, assume that the source computing device is associated with a particular user ID. The fourth copy mode can involve sending the selected content item 506 to all target computing devices associated with the same user ID.

A fifth copy mode (not shown in FIG. 5) involves a formatting operation. For example, upon selecting this option, the clipboard component can create a particular formatted version of the selected content item 506, and then store the thus-formatted content item in the local multi-item clipboard store. Or the local clipboard component can remove all (or some) formatting from the selected content item 506 prior to storing it in the multi-item clipboard store.

A sixth copy mode (not shown in FIG. 5) treats the selected content item 506 as a partial result item to be concatenated with a previously stored content item. For instance, assume that the multi-item clipboard item presently stores the text "abc" as its topmost (most recent) content item. Further assume that the selected content item 506 corresponds to the text "def" The user can store the selected content item 506 ("def") in a concatenation mode, whereupon the clipboard component will modify the topmost content item to the text, "abcdef" The user can subsequently add one or more additional content items to the topmost content item in a similar fashion. Later, the user can invoke a paste operation to paste the entire concatenated result as a single item.

Other copy modes (not shown in FIG. 5) involve associating one or more properties with the selected content item 506. Each property governs the behavior of the clipboard component with respect to the selected content item 506. For instance, such a property can govern the manner in which the clipboard component displays the content item 506 or otherwise provides access to the content item 506. Alternatively, or in addition, a property can control the manner in which the clipboard component retains the content item 506, and so on.

For instance, in a seventh copy mode, the clipboard component tags the selected content item 506 as being a private piece of information. For example, the sixth copy mode can associated the selected content item 506 with a metadata value that indicates that it is a sensitive item, such as a password, contact address, credit card number, etc. The clipboard component will subsequently prevent a multi-option UI presentation (such as the presentation 102 shown in FIG. 1) from displaying the selected content item 506. For instance, instead of presenting a text string that reveals a password, the clipboard component can display default dummy characters, such as dot symbols or # symbols.

In an eighth copy mode, the clipboard component tags the selected content item as being a favorite item. In response, the clipboard component will subsequently maintain the content item 506 in its topmost slot in the multi-item clipboard store, even when the user later adds additional content items to the multi-item clipboard store.

In a ninth copy mode, the clipboard component tags the selected content item as being a temporary item. In response, the clipboard component will subsequently delete the content item 506 after a prescribed amount of time and/or after some event has taken place (e.g., after the user has pasted the content item 506).

The above-described copy modes are set forth in the spirit of illustration, not limitation. Other implementations can include any combination of copy modes, including additional copy modes not identified above.

A configuration tool (not shown) allows the user to configure the multi-option interface 508 such that it includes a particular collection of copy modes. For example, the configuration tool can provide a configuration UI presentation that lists a set of possible copy modes. The user may select a subset of these modes that will appear in the multi-option UI presentation 508, e.g., by checking off certain modes on the configuration UI presentation. The configuration tool can also allow the user to create custom copy modes. For example, the configuration tool can allow the user to create cross-device copy modes that direct content items to specific user computing devices.

At juncture "C," assume that the user presses the C key two more times, while pressing down on the control key. In response to the first actuation of the C key, the clipboard component advances to the second copy mode. In response to second actuation of the C key, the clipboard component advances to a third copy mode 512.

At juncture "D," assume that the user releases the control key. In response, the clipboard component causes the selected content item 506 to be copied per the third copy mode. In the non-limiting example of FIG. 5, the clipboard component executes the third copy mode by locally storing the selected content item 506 in a local multi-item clipboard store, and also transferring the selected content item 506 to a user computing device A. The user computing device A, upon receipt, will store the selected content item 506 in its own local multi-item clipboard store.

Figure 6:
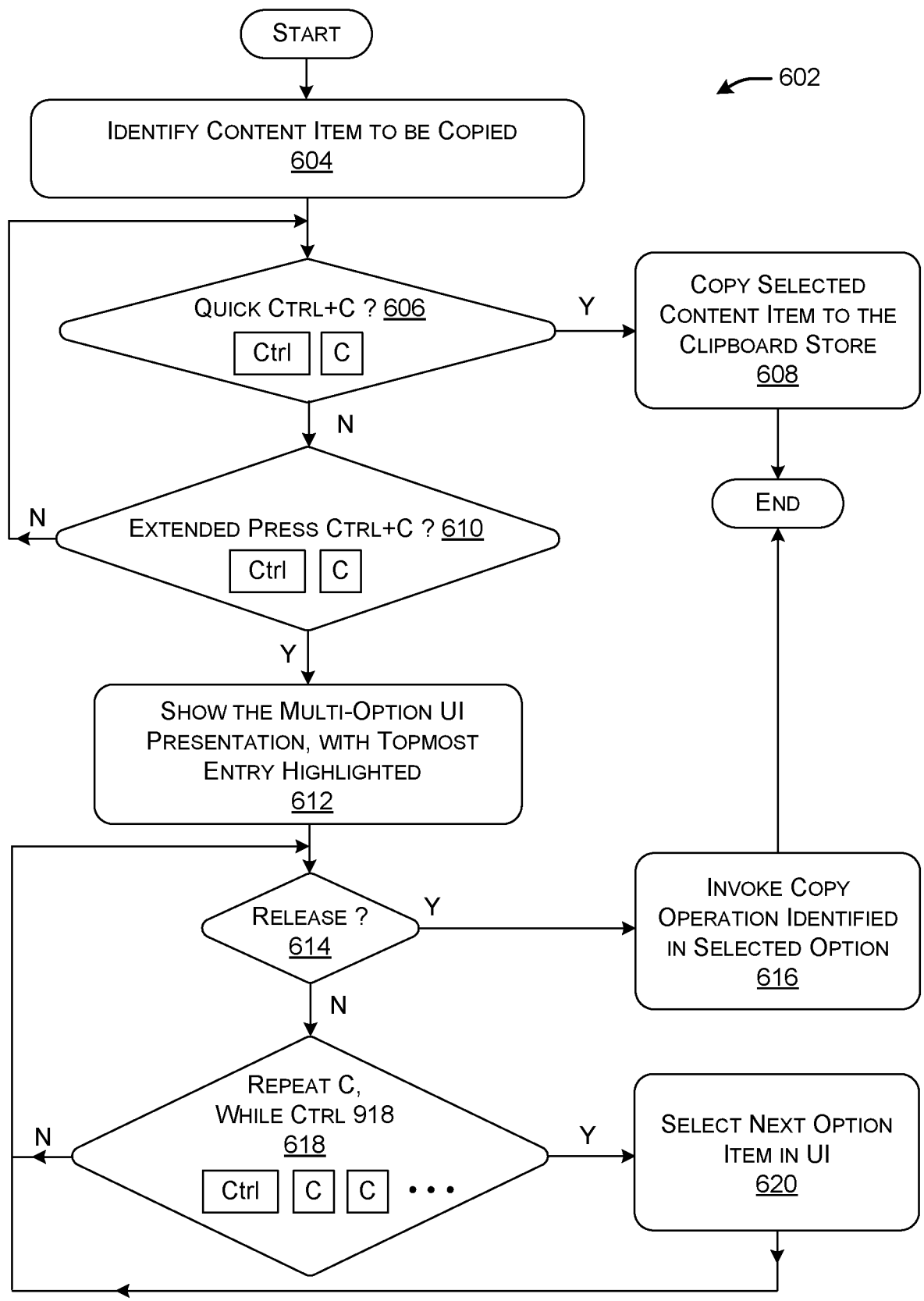
FIG. 6 is a flowchart which describes the operations in the user experience shown in FIG. 5.

FIG. 6 is a process 602 which describes the user experience shown in FIG. 5. In block 604, a user interacts with an application to identify the selected content item 506. In block 606, the clipboard component determines whether the user has simultaneously pressed the control key and the C key, but for less than (or equal to) a prescribed amount of time prior to releasing these keys. If so, in block 608, the clipboard component stores the selected content item in its topmost slot in a multi-item clipboard store, or in its only slot in a single-item clipboard store.

Alternatively, in block 610, the clipboard component determines whether the user has simultaneously pressed the control key and the C key for more than the prescribed amount of time. If so, in block 612, the clipboard component will show the multi-option UI presentation 508, with its topmost entry highlighted.

In block 614, the clipboard component determines whether the user has released the control key. If so, in block 616, the clipboard component invokes whatever copy mode happens to be selected at that time.

In block 618, the clipboard component determines whether the user has pressed the C key one or more additional times, while holding down the control key. If so, in block 620, the clipboard component advances to a next copy mode each time the user presses the C key.

Figure 7:
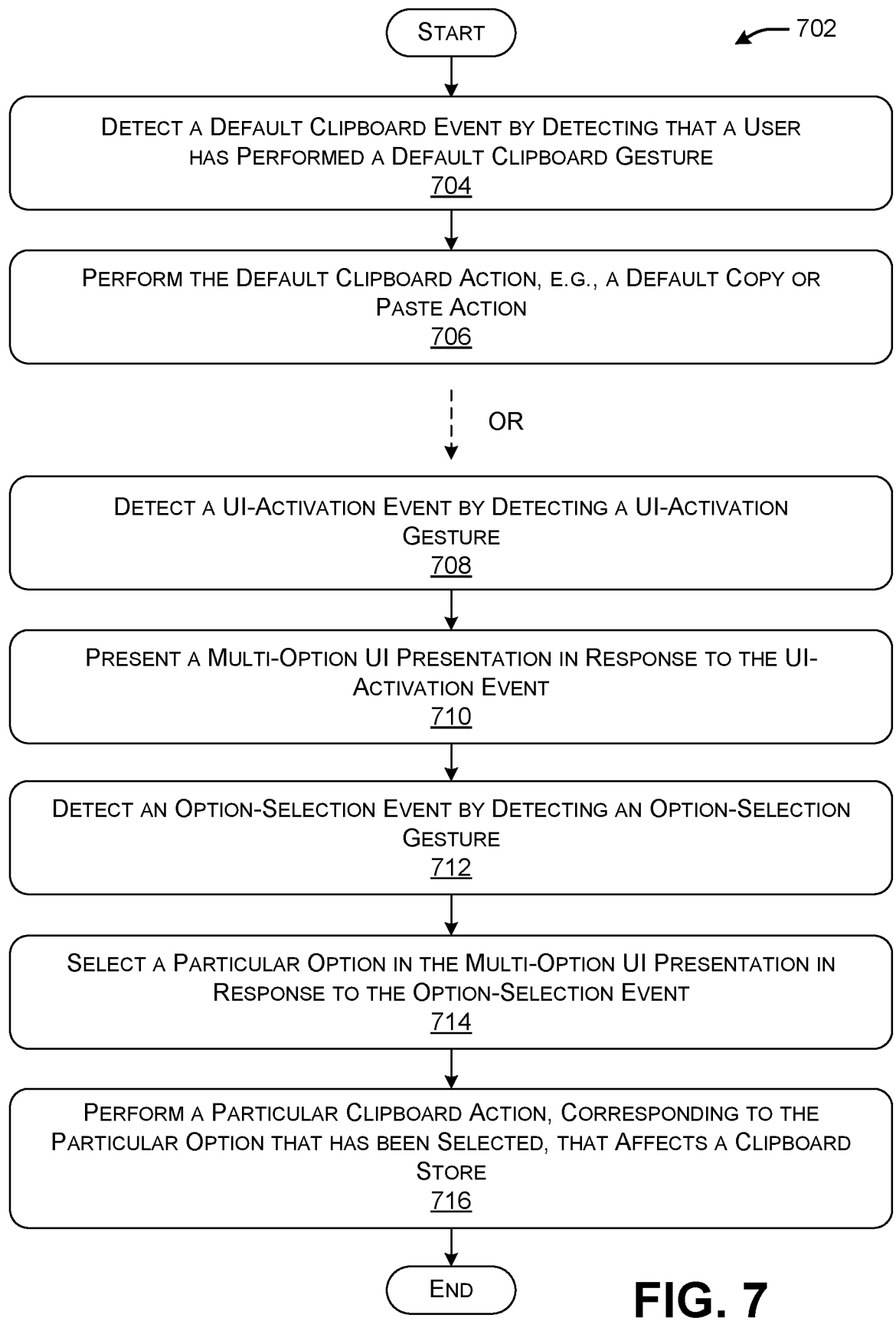
FIG. 7 is a flowchart which summarizes one way of interacting with a clipboard store, and which encompasses the particular workflows illustrated in FIGS. 1-6.

FIG. 7 shows a process 702 which describes one way of interacting with a clipboard component, which encompasses the particular workflows illustrated in FIGS. 1-6. That is, the process 702 is described in general terms that encompass either a paste operation or a copy operation.

In block 704, the clipboard component detects a default clipboard event by detecting that a user has performed a default clipboard gesture. The default clipboard gesture may correspond to a quick Ctrl+V gesture (for a paste operation) or a quick Ctrl+C gesture (for a copy operation). Generally, the control key is an example of a modifier key, and the V key and the C keys are examples of "hot" keys. In response to the detection in block 704, in block 706, the clipboard component performs a default clipboard action. For instance, the clipboard component in conjunction with a particular application can paste a topmost entry in a multi-item clipboard store into a target work item. Or the clipboard component, in conjunction with the particular application, can copy a selected content item into a topmost slot of the multi-item clipboard store.

Alternatively, in block 708, the clipboard component detects a UI-activation event by detecting that a user has performed a UI-activation gesture. The user may perform a UI-activation gesture by holding down the control key and the V key, or by holding down the control key and the C key, for more than a prescribed amount of time. Generally stated, the user performs the UI-activation gesture by holding down the modifier key and a hot key for more than the prescribed amount of time. In response, in block 710, the clipboard component presents a multi-option UI presentation. That is, in the case of a paste operation, the clipboard component presents the multi-option UI presentation 102 of FIG. 1. In the case of a copy operation, the clipboard component presents the multi-option UI presentation 508 of FIG. 5.

In block 712, the clipboard component detects an option-selection event by detecting that the user has performed an option-selection gesture. The user may perform the option-selection gesture by activating the V key or C key zero, one or more times, followed by releasing the control key. Alternatively, in the case of FIG. 3, the user may perform the option-selection gesture by using a mouse device or touch gesture to select an option in the sticky multi-option UI presentation 306. In response, in block 714, the clipboard component selects a particular option in the multi-option UI presentation.

In block 716, the particular application, in cooperation with the clipboard component, performs a particular clipboard operation. In the case of a paste operation, the clipboard component sends a selected content item to the application, whereupon the application pastes the selected content item into a target work item. In the case of a copy operation, the clipboard component copies a selected content item in conformance with a selected copy mode.

Other implementations can use the control key (or any other modifier key) and the V key or C key (or any other hot key) to generate the UI-activation event and the option-selection event in a different manner compared to that described above. For instance, in another case, the clipboard component starts a timer when the user presses the modifier key and a hot key at the same time. Thereafter, the clipboard component will display the multi-option UI presentation when the user holds down the modifier key (e.g., the control key) for more than a prescribed amount of time. In this implementation, however, the user is not required to also hold down the hot key (e.g., the V key or the C key). More explicitly stated, the user is not required to simultaneously press the modifier key and the hot key for the entire duration of the prescribed amount of time, so long as the user presses both keys together to start the timer, and thereafter holds down the modifier key for the prescribed amount of time. On the other hand, the clipboard component will perform a default clipboard action (e.g., a default paste or copy operation) if the user releases the modifier key prior to (or equal to) the expiration of the prescribed amount of time.

In yet another variation, the clipboard component can display the multi-option UI presentation prior to the expiration of the prescribed amount time when the user: (1) presses the modifier key and a hot key at the same time; (2) releases the hot key while holding down the modifier key; and then (3) reasserts the hot key while holding down the modifier key, where operations (1)-(3) all take place before the expiration of the prescribed amount of time. The user can use the above control strategy to quickly display the multi-option UI presentation, without waiting for the expiration of the prescribed amount of time.

Other implementations can interact with the multi-item clipboard store using other controls, e.g., besides the control key and the V key or the C key (or in addition to these keys). Consider the paste operation, for instance. In another case, the clipboard component activates the multi-option UI presentation 102 when the user activates a single control mechanism (e.g., a hard or soft key) for a prescribed amount of time. The clipboard component can then sequence through the list of options in the multi-option UI presentation 102 so long as the user holds the control mechanism down, e.g., by spending 1 second on each option, in rotation. The clipboard component will paste whatever option is selected at the time that the user releases the single control mechanism. But if the user activates the single control mechanism for a short period of time, the clipboard component will perform a traditional paste operation, e.g., by pasting the topmost content item of the clipboard store into the work item.

In another case, the clipboard component activates the multi-option UI presentation 102, and then selects an option within the multi-option UI presentation 102, when the user activates one or more touch gestures of any type in a prescribed manner on a touch-sensitive surface. Still other implementations can leverage device motion-based gestures, free-space gestures, haptic input mechanisms, etc., or any combination thereof.

The clipboard component can likewise perform the copy process 602 described above in response to the actuation of other control mechanisms, e.g., besides, or in addition to, the control key and the C key. For example, the clipboard component can use the same kind of alternative control strategies described above with respect to the paste operation, e.g., by using a single key actuation, or by using one or more touch gestures, etc.

B. Illustrative Systems and Devices

Figure 8:
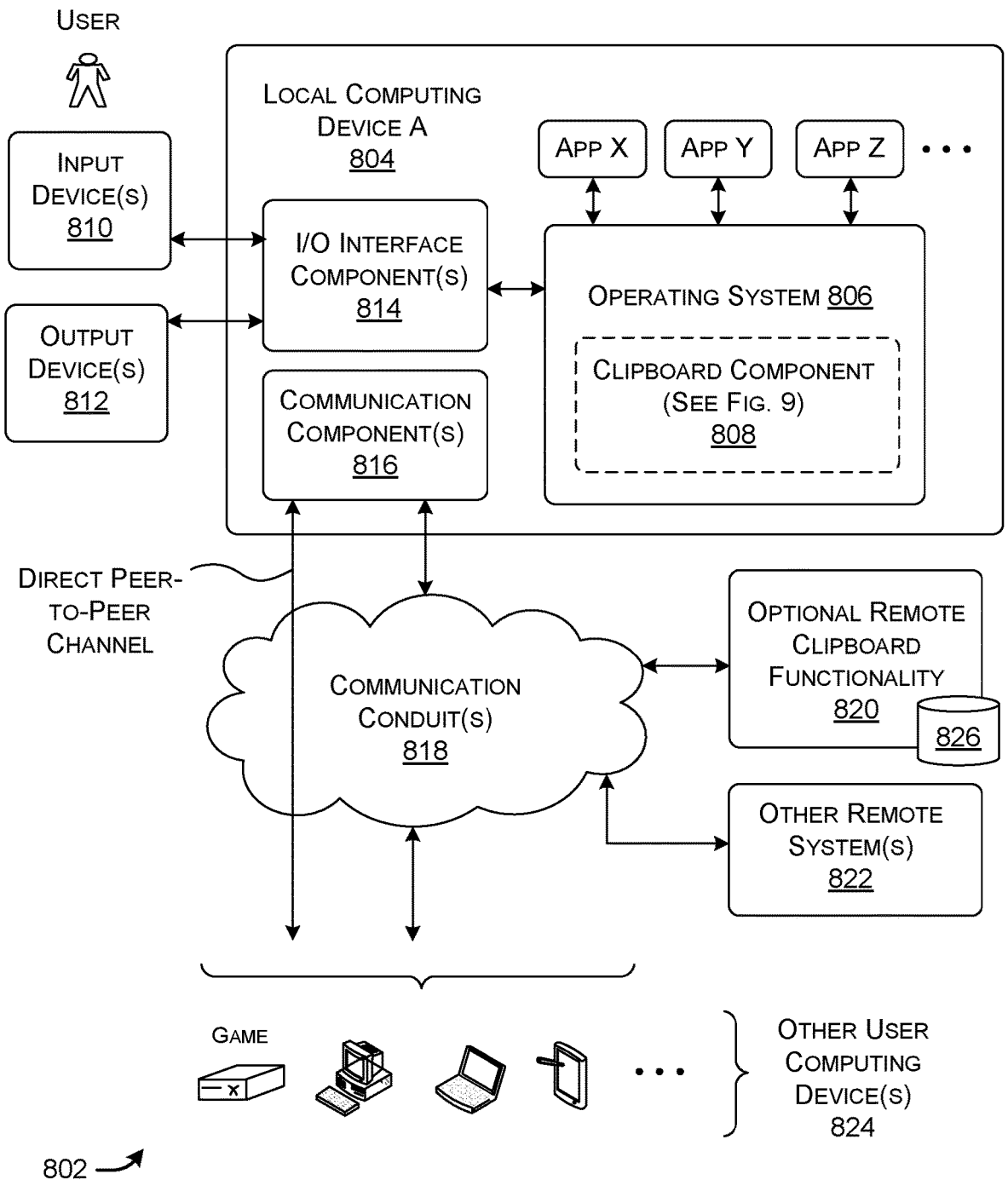
FIG. 8 shows a system for implementing a multi-item clipboard store.

FIG. 8 shows one system 802 for implementing the user experiences described in Section A. In some implementations, the system 802 provides the user experiences using a local computing device 804. The local computing device 804 can correspond to any user computing device, such as a desktop personal computing device, a handheld computing device of any type (such as a smartphone), a game console, a wearable computing device, and so on. The computing device 804 hosts any number of local applications (e.g., App X, App Y, App Z, etc.). In addition, or alternatively, the computing device 804 can provide access to remotely-implemented applications (not shown). Each remotely-implemented application is hosted by some remote site, such as a remote server computing device. In addition, or alternatively, the computing device 804 can provide access to distributed applications (not shown). Each distributed application includes some functionality that is implemented by the local computing device 804 and some functionality that is implemented by some remote site(s). In whatever manner implemented, any application can perform any function(s).

Figure 9:
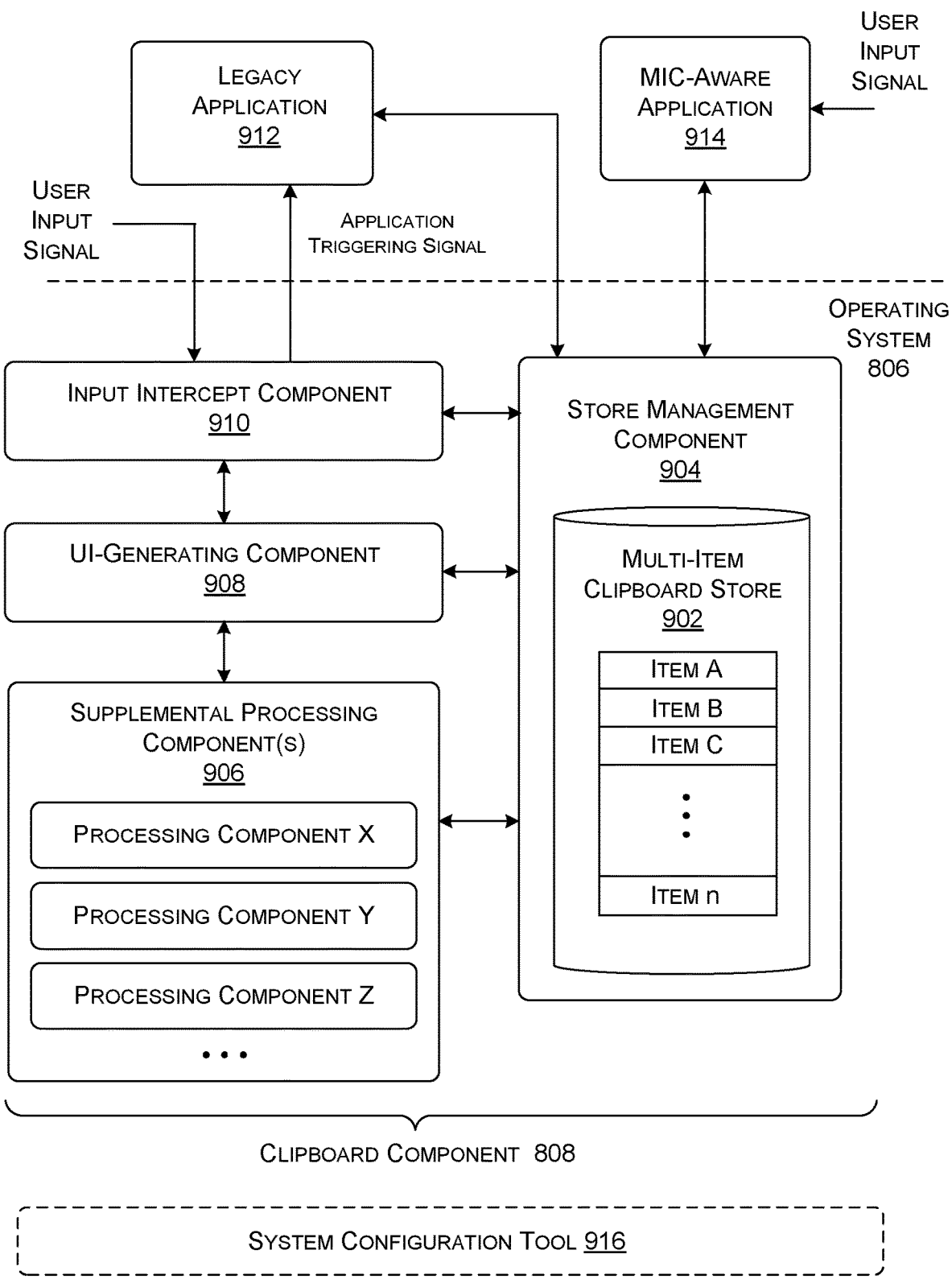
FIG. 9 shows one way of implementing a clipboard component, which is a part of the system of FIG. 8.

The local computing device 804 can also include an operating system 806. The operating system 806 provides resources for use by the applications in performing their respective functions. As part thereof, the operating system 806 can include a clipboard component 808. The clipboard component 808 can host a multi-item clipboard store or a single-item clipboard store. FIG. 9, described below, provides further illustrative details regarding one implementation of the clipboard component 808.

A user may interact with the applications and the clipboard component 808 using one or more input devices 810 and one or more output devices 812, via one or more input/output interface components 814. The input device(s) 810 can include a physical key input device of any type (e.g., a physical keyboard). The input device(s) 810 can also include a soft key input device of any type (e.g., as provided by a touch-sensitive input surface). The input device(s) 810 can also include any other input mechanisms, such as mouse device input mechanisms, game controller input mechanisms, audio (voice) input mechanisms, touch-based gesture input mechanisms (in which the user performs touch gestures on a touch-sensitive input surface other than key activations, such as swipes, etc.), motion-based input mechanisms (in which the user performs gestures by moving the computing device 804 or part thereof), haptic input mechanisms, and so on. The output device(s) 812 can include any type of display device that provides a GUI.

The local computing device 804 also provides a communication component 816 (e.g., a network interface card) by which the local computing device 804 exchanges data with one or more remote entities via one or more communication conduits 818 of any type. For example, the local computing device 804 can interact with optional remote clipboard functionality 820 (e.g., as implemented by one or more remote server computing devices), one or more other remote computing systems 822, and any number of other user computing devices 824. In one implementation, the local computing device 804 and the other computing devices 824 represents devices affiliated with the same user ID. Further, the remote clipboard functionality 820 can host a remote multi-item clipboard store 826 (e.g., a cloud-implemented clipboard store) that is also associated with the same user ID.

In one scenario, the local computing device 804 can copy a selected content item to a remote multi-item clipboard store maintained by another user computing device (selected from the set of other user computing devices 824). In another scenario, the local computing device 804 can retrieve a content item from a remote multi-item clipboard store maintained by another user computing device. In another scenario, the local computing device can copy a selected content item to the remote multi-item clipboard store 826. In another scenario, the local computing device 804 can retrieve a content item from the remote multi-item clipboard store 826, and so on.

The communication conduit(s) 818 can be implemented by a wide area network (e.g., the Internet), a local area network, one or more point-to-point links, etc. The clipboard component 808 of the local computing device 804 can select a particular communication channel based on one or more environment-specific factors, in a manner described below. For example, in some circumstances, the clipboard component 808 can use a direct peer-to-peer channel to transfer a content item to another user computing device. In other circumstances, the clipboard component 808 can provide a content item to another user computing device by first storing it in the remote multi-item clipboard store 826.

FIG. 9 shows one way of implementing a clipboard component 808 of FIG. 8. The clipboard component 808 includes a multi-item clipboard store 902 that stores up to n content items. The clipboard component 808 also includes a store management component 904 that performs, among other functions, the task of storing content items in the multi-item clipboard store 902 and retrieving content items from the multi-item clipboard store 902.

The clipboard component 808 can also optionally include one or more supplemental processing components 906, such as processing components X, Y, and Z. Each processing component performs some operation on a content item in conjunction with a copy operation. For example, when the user selects a particular copy mode (using the strategy of FIG. 5), one of the processing components can transfer the selected content item to one or more target computing devices.

The clipboard component 808 also provides a UI-generating component 908. The UI-generating component 908 generates and displays the multi-option UI presentation described in Section A. In the context of a paste operation, the multi-option UI presentation provides a visual representation of the content items in the multi-item clipboard store 902. In the context of a copy operation, the multi-option UI presentation provides a visual representation of different copy modes.

The clipboard component 808 also provides an input intercept component 910. The input intercept component 910 provides services which enable legacy applications to interact with the multi-item clipboard store 902, such as illustrative legacy application 912. A legacy application refers to an application that was not specifically designed to interact with the multi-item clipboard store 902. For example, one such legacy application may correspond to a word processing application that was built to interact with a single-item clipboard store, e.g., by calling on a first legacy application programming interface (API) to store a content item in the single-item clipboard store, and calling on another legacy API to retrieve a content item from the single-item clipboard store.

In some implementations, the input intercept component 910 operates by intercepting a clipboard input signal produced by a user in the course of interacting with the particular legacy application 912, preventing the legacy application 912 from receiving and acting on it. The input intercept component 910 then instructs some component(s) of the clipboard component 808 to perform some preparatory action(s), examples of which will be described in detail below with reference to FIGS. 11 and 12. The input intercept component 910 can then send an application triggering signal to the legacy application 912. The legacy application 912 interprets the application triggering signal as if it was a traditional clipboard command that was directly issued by the user, e.g., corresponding to a conventional Ctrl+V or Ctrl+C command. The legacy application 912 then carries out a paste or copy operation, e.g., by retrieving a content item from the multi-item clipboard store 902 or storing a content item in the multi-item clipboard store. The preparatory action (described below) recasts a legacy paste or copy operation, such that, overall, the clipboard component 808 performs functions that accomplish more than the traditional paste or copy operation.

In other implementations, a multi-item-clipboard-aware (MIC-aware) application 914 directly interacts with the clipboard component 808 using one or more APIs that specifically leverage the multi-item nature of the clipboard component 808. In other words, the MIC-aware application 914 does not utilize the above-described redirection provision that is provided by the input intercept component 910.

A system configuration tool 916 allows an end user or developer to configure any aspects of the operation of the clipboard component 808. For example, a user can manually enable or disable the type workflow experience described in Section A on an application-by-application basis. Further, the user can manually select which copy modes are presented in the multi-option UI presentation.

Note that FIG. 8 indicates that all of the functions of the clipboard component 808 are implemented by the operating system 806 of the computing device 804. But other implementations can allocate clipboard functions in other ways. For example, an MIC-aware application can generate an application-specific user interface presentation by which a user, who is interacting with the application, can interact with the multi-item clipboard store 902.

Figure 10:
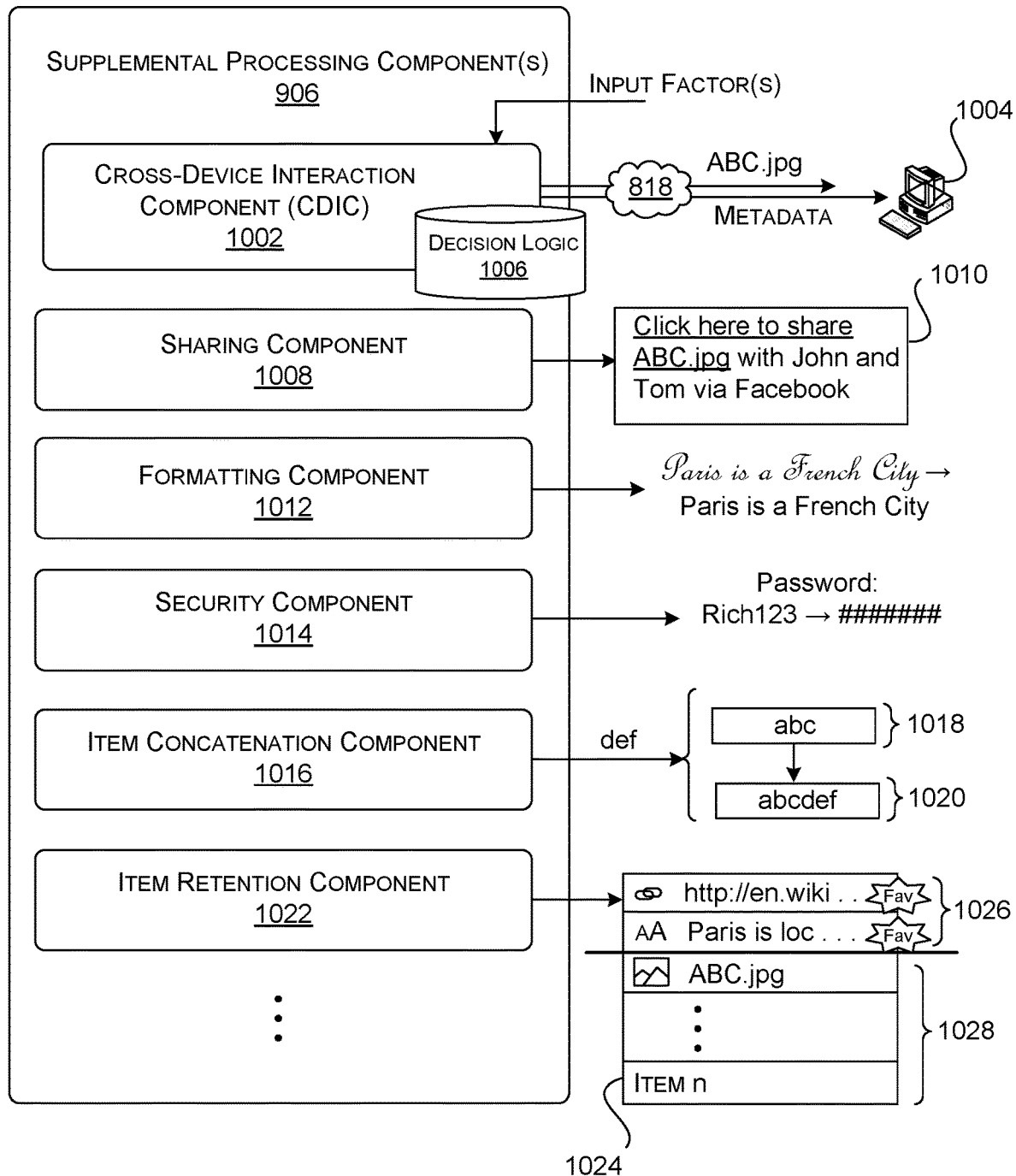
FIG. 10 shows illustrative supplemental processing components that perform respective operations on content items, pursuant to various copy modes.

FIG. 10 shows illustrative supplemental processing components 906 that perform respective operations on content items provided to the clipboard component 808. In some implementations, a supplemental processing component can perform its services in conjunction with a copy operation. That is, the clipboard component 808 can call on a particular processing component when it stores a particular content item in a multi-item clipboard store, or, in some implementations, a single-item clipboard store. In other cases, a user can invoke a supplemental processing component to operate on a content item that is already stored in a clipboard store.

A cross-device interaction component (CDIC) 1002, for instance, invokes it services when the user selects a copy mode that involves a cross-device transfer operation. In one such case, the CDIC 1002 manages the transfer of a selected content item from the local computing device 804 to a remote target computing device 1004 (and/or plural computing devices) and/or to the remote multi-item clipboard store 826 (shown in FIG. 8), etc.

The CDIC 1002 can use different rules to perform the cross-device transfer operation. For instance, in some implementations, the CDIC 1002 can use a rules-based engine to map a set of input factors into a selection of a particular communication channel, with reference to one or more rules. In other implementations, the CDIC 1002 can use a machine-trained model to map a set of input factors into a selection of a particular communication channel. In conjunction therewith, a data store 1006 stores a collection of rules, machine-learned weighting values, etc. The set of input factors can include any context-based information, such as the time of day, the location of the source computing device 804, the location of each target computing device, the current performance of the available communication channels, the costs of the of the available communication channels, etc.

Pursuant to one such rule, the CDIC 1002 can choose a communication channel based, at least in part, on the location of the target computing device 1004 relative to the source computing device 804. For instance, if the distance between the two computing devices (804, 1004) is below a prescribed threshold (such as a few meters), then the CDIC 1002 will use a direct peer-to-peer channel to transfer the selected content item, e.g., using a Bluetooth channel. If the distance is above the prescribed threshold, the CDIC 1002 can send the content item as a message over a wide area network, using any messaging protocol(s). Or the CDIC 1002 can send the content item to the remote multi-item clipboard store 826, where it can be subsequently retrieved by the target computing device 1004, and so on. Still other environment-specific communication options are possible.

The CDIC 1002 can determine the distance between any two computing devices in any manner, such as by detecting the respective positions of the two devices using any position-determining mechanism(s) (e.g., a GPS mechanism, a radio triangulation mechanism, a wireless source proximity-determining mechanism, etc.), and then comparing the two positions. Or the CDIC 1002 can determine the proximity of the target computing device 1004 relative to the source computing device 804 using a Near Field Communication (NFC) mechanism or the like, and so on.

Pursuant to another rule, the CDIC 1002 can choose a communication channel based, at least in part, on the size of the selected content item. In one approach, the CDIC 1002 can use a first (fast) communication channel to send a content item if the seize of that content item is below a prescribed threshold (e.g., 20 MB), and use a second (slower) communication channel to send a content item if the size of that content item is above the prescribed threshold. For example, CDIC 1002 can directly send a below-threshold content item via a direct message, and can send an above-threshold content item via intermediate storage in the remote multi-item clipboard store 826.

Pursuant to another rule, the CDIC 1002 can immediately use a first (fast) communication channel to send the metadata associated with an above-threshold content item, and can use a second (slower) communication channel to send the actual content itself. Upon receipt, the target computing device 1004 can immediately paste the metadata associated with the content item, e.g., by pasting a thumbnail image of a large image file. This informs the user of the target computing device 1004 of the nature of the content item that will be pasted. The target computing device 1004 can then replace the metadata with the actual content item, when it eventually arrives at the target computing device 1004.

Other rules can choose a communication channel based on any combination of: time of day, network availability, network performance (e.g., network link status, network congestion, etc.), network cost, user configuration preferences, and so on.

A sharing component 1008 invokes its services when the user opts for a copy mode that involves a copy-and-share operation. When triggered, the sharing component 1008 provides a user interface presentation (such as the illustrative user interface presentation 1010) that invites the user to share the content item with one or more selected target sharing sites, such as a selected social network site, and with respect to one or more selected target recipients (or the entire public), and with respect to one or more selected sharing modes. The sharing component 1008 then transfers the content item to the selected target recipient(s) via the selected target sharing site(s) and mode(s).

A formatting component 1012 invokes it services when the user opts for a copy mode that involves a formatting operation. For example, the formatting component 1012 can convert a selected content item to a desired format, or remove formatting from the content item.

A security component 1014 invokes it services when the user opts for a copy mode that involves some security-related provision. For example, the security component 1014 can tag a content item as being sensitive information. Thereafter, the security component 1014 can prevent the store management component 904 from displaying the content item. For instance, the security component 1014 can display dummy symbols in place of the characters of the content item.

In another case, when instructed, the security component 1014 can prevent a selected content item from advancing to any slot in the multi-item clipboard store 902 beyond the topmost slot. In another case, the security component 1014 can automatically delete a sensitive content item after a prescribed amount of time, or when some identified event happens (such as when the user pastes the content item, or when the user closes a particular application, etc.). These provisions reduce the risk that sensitive information will be inadvertently disclosed, e.g., due to the user forgetting that the multi-item clipboard store 902 contains sensitive information, causing that sensitive information being accessed by unintended users.

An item concatenation component 1016 invokes it services when the user selects a copy mode that involves concatenating content items. That is, when triggered, the concatenation component 1016 concatenates a current selected content item (e.g., the characters "def") with a previous selected content item 1018 (e.g., the characters "abc") in the topmost slot of the multi-item clipboard store 902, to produce a concatenated content item 1020 (e.g., "abcdef"). The item concatenation component 1016 then stores the concatenated content item 1020 in the topmost slot of the multi-item clipboard 902, replacing the previous selected content item 1018. The user may subsequently paste the topmost content item 1020 (e.g., "abcdef") into any target work item.

An item retention component 1022 invokes its services when the user selects a copy mode that involves storing the selected content item in a particular manner. For example, when the user designates a selected content item as a favorite item, the item retention component 1022 can tag it as such. Thereafter, the store management component 904 (or the item retention component 1022 itself) can prevent the content item from being dislodged from its topmost position within the multi-item clipboard store 902.

The clipboard component 808 can also present a user interface presentation (e.g., UI presentation 1024) that demarcates a list of favorite content items 1026 (that have been tagged as favorites), and a list of other content items 1028 (that have not been designated as favorites). The clipboard component 808 can add any new content item to the topmost slot of the list of non-favorite content items 1028, pushing the existing non-favorite content items down in the list of non-favorite content items 1028, and leaving the list of favorite content items 1026 intact.

The item retention component 1022 can also, upon instruction from the user, retrospectively mark any content item in the list of non-favorite content items 1028 as a favorite, upon which the item retention component 1022 adds that content item to the list of favorite content items 1026.

The supplemental processing components 906 can include yet other processing components. The above examples were set forth in the spirit of illustration, not limitation. Further note that FIG. 5 represents just one technique for invoking a particular copy mode, and the processing component(s) associated therewith. Other implementations can invoke a copy mode and its processing component(s) through some other mechanism than that illustrated in FIG. 5.

Figure 11:
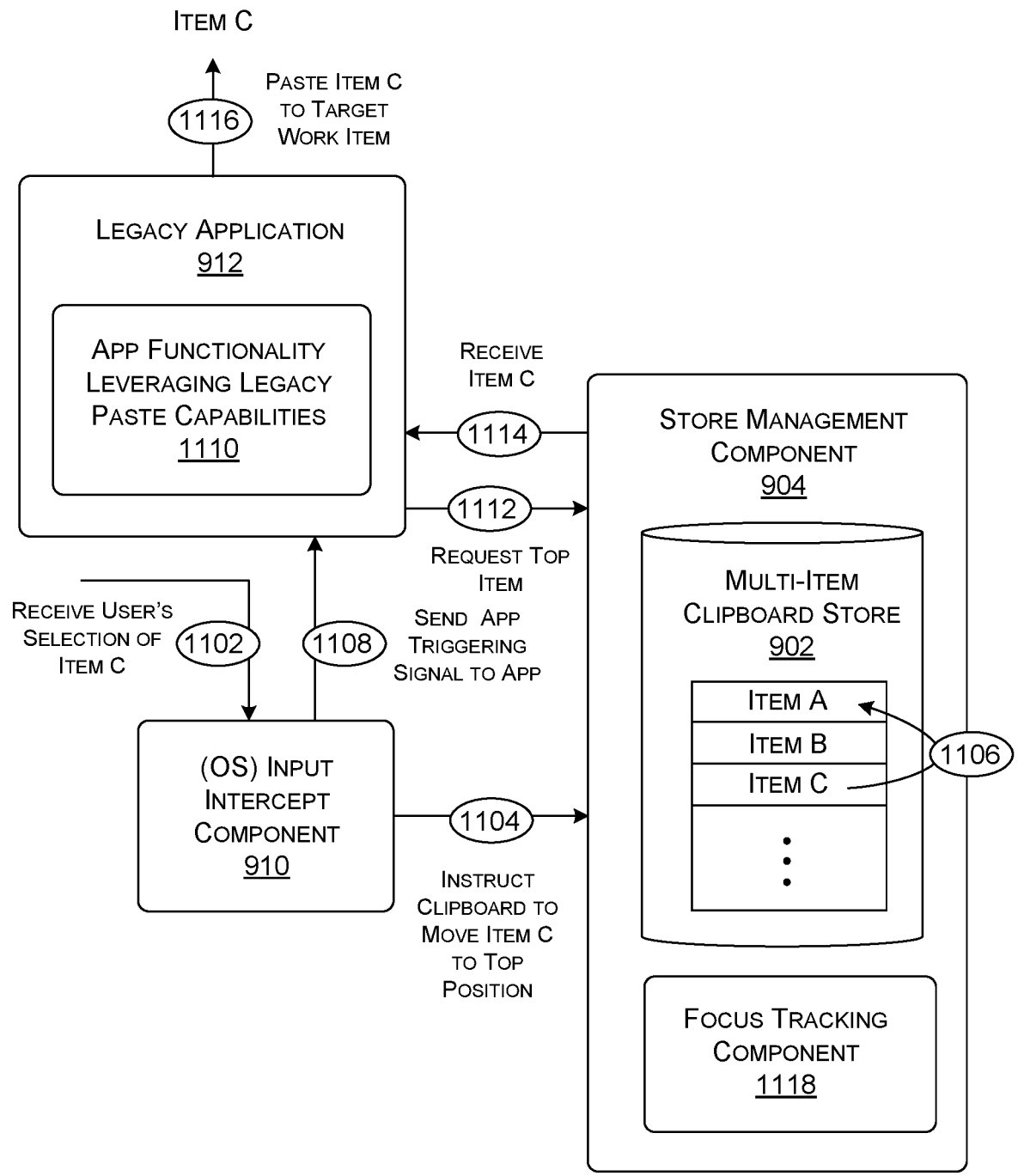
FIG. 11 is a signal diagram which shows how a legacy application can interact with the clipboard component of FIG. 9 to perform a paste operation, even though the legacy application may not have been originally designed to interact with a multi-item clipboard store.

Advancing to FIG. 11, this figure is a signal diagram which shows how the legacy application 912 can interact with the clipboard component 808 of FIG. 8 to perform a paste operation, even though the legacy application 912 may not have been originally designed to interact with a multi-item clipboard store. The figure is annotated with reference numbers which describe a sequence of operations.

First assume that the user interacts with the legacy application 912, e.g., by initially using an input device to press down the control key and the V key for more than a prescribed period of time. Next assume that the user presses the V key an additional two times while holding down the control key, followed by release of the control key. This series of operations has the effect of selecting a content item C in the multi-item clipboard store 902.

In operation 1102, the input intercept component 910 intercepts and acts on the user's input signals. For example, the input intercept component 910 initially instructs the UI-generating component 908 (not shown in FIG. 11) to display a multi-option UI presentation. The input intercept component 910 then instructs the UI-generating component 908 to advance to content item C.

In operation 1104, upon the user's selection of content item C, the input intercept component 910 instructs the store management component 904 to perform a preparatory action, here corresponding to moving the content item C from the third position in the multi-item clipboard store 902 to the top position. In operation 1106, the store management component 904 performs the operation as instructed.

In operation 1108, the input intercept component 910 sends an application triggering signal to the legacy application 912. Legacy application functionality 1110 provided by the legacy application 912 treats this triggering signal as if it constituted a Ctrl+V command sent directly by the user. In response, in operation 1112, the legacy application functionality 1110 uses an API to request what it expects is the only content item in the multi-item clipboard store 902 (because it is designed to interact with a single-item clipboard store, rather than a multi-item clipboard store). In response, in operation 1114, the store management component 904 delivers the topmost entry in the multi-item clipboard store 902, which is the content item C. In operation 1116, the legacy application functionality 1110 pastes the content item C into a target work item.

In other words, the input intercept component 910 performs the background task of modifying the multi-item clipboard store 902 such that the content item selected by the user is the topmost content item. The legacy application 912 thereafter is prompted to retrieve the topmost content item. By virtue of the overall technique, the legacy application 912 can retrieve any content item in the multi-item clipboard store 902 without having any knowledge that it stores multiple content items.

The above-described series of operations also applies to the workflow shown in FIG. 3. In that scenario, the user selects a content item in the "sticky" multi-option UI presentation 306. The input intercept component 910 then performs the same operations as above, e.g., by instructing the store management component 904 to move the selected content item to the topmost slot in the multi-item clipboard store, and then sending an application triggering signal to the legacy application 912.

In the case of the scenario of FIG. 3, a focus tracking component 1118 performs the additional function of determining a target work item that is to receive the content item C. The store management component 118 then transfers the content item C to whatever legacy application controls or is otherwise associated with the target work item. The focus tracking component 1118 can determine the target work item in different ways. In one implementation, the focus tracking component 1118 can store the identity of the work item with which the user last interacted, prior to engaging the multi-option UI presentation 306. The focus tracking component 1118 picks this work item as the target work item, since it was the last work item to receive the user's focus before the user engaged the multi-option UI presentation 306. The legacy application (that controls the target work item) and/or the focus tracking component 1118 can store the location at which the content item is to be pasted into the target work item.

Figure 12:
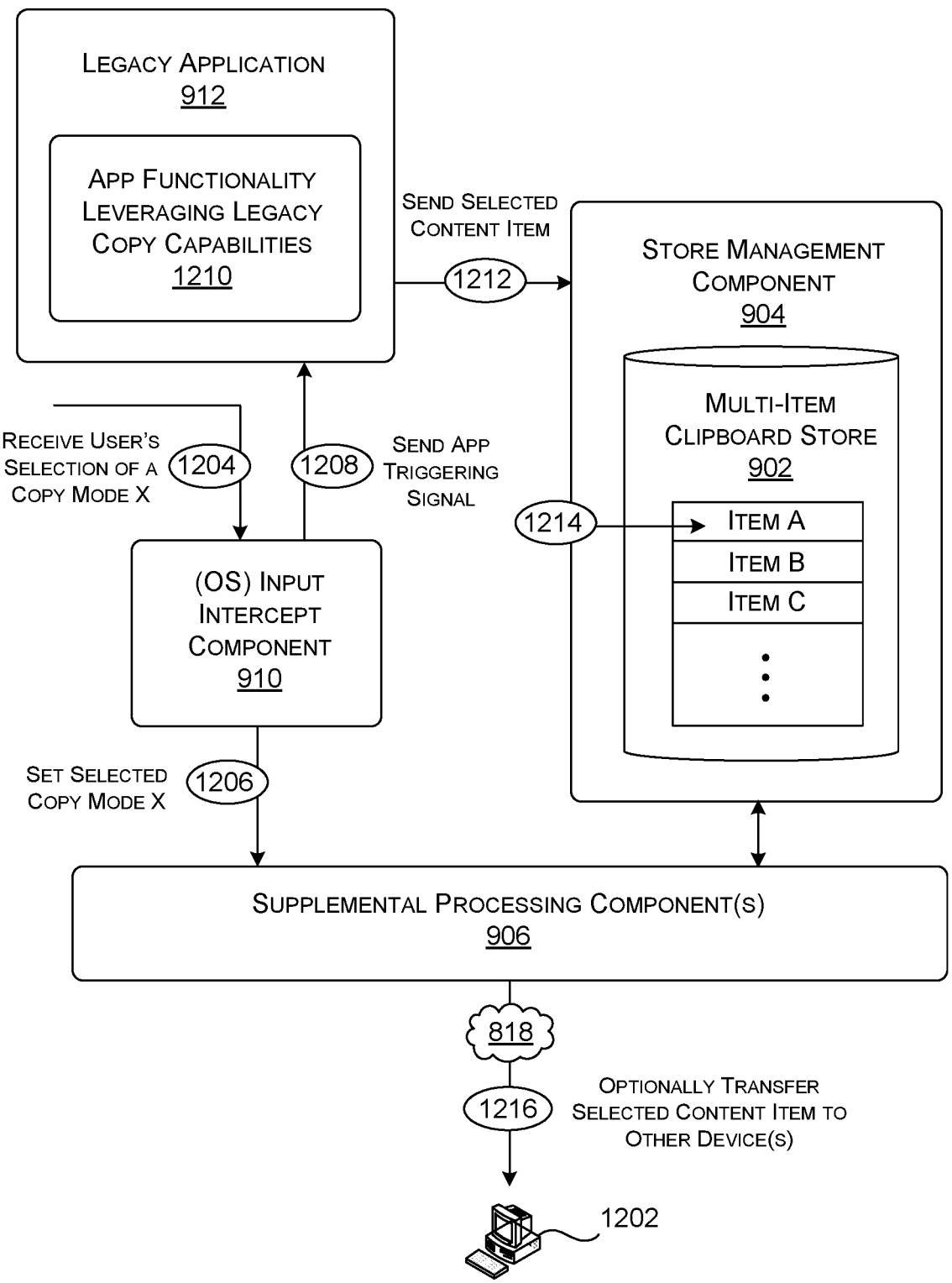
FIG. 12 is a signal diagram which shows how a legacy application can interact with the clipboard component of FIG. 9 to perform a copy operation, associated with a particular copy mode.

FIG. 12 is a signal diagram which shows how the legacy application 912 can leverage the clipboard component of FIG. 9 to perform a copy operation that conforms to a selected copy mode X. In this merely illustrative case, assume that copy mode X involves the storage of a selected content item in the local multi-item clipboard store 902, together with the transfer of the content item to a remote computing device 1202, where it is also stored in that device's local multi-item clipboard store.

Assume that the user performs the actions described in FIG. 5 to activate the multi-option UI presentation 508, and thereafter selects the option corresponding to copy mode X. In operation 1204, the input intercept component 910 intercepts the user's input signals produced by the user's actions. In operation 1206, the input intercept component 910 instructs the supplemental processing component(s) 906 to select copy mode X. In operation 1208, the input intercept component 910 can send an application triggering signal to the legacy application 912.

Legacy application functionality 1210 receives the application triggering signal and interprets it as a traditional Ctrl+C command from the user. In response, in operation 1212, the legacy application functionality 1210 requests the store management component 904 to store the selected content item. In operation 1214, the store management component 904 stores the content item in the topmost slot of the multi-item clipboard store 902. In operation 1216, the supplemental processing component(s) 906 transfers the selected content item to the target computing device 1202, pursuant to the selected mode X. Note that the supplemental processing component(s) 906 will perform other actions for other respective modes. Further, other implementations can vary the order of operations described above in any manner.

Figure 13:
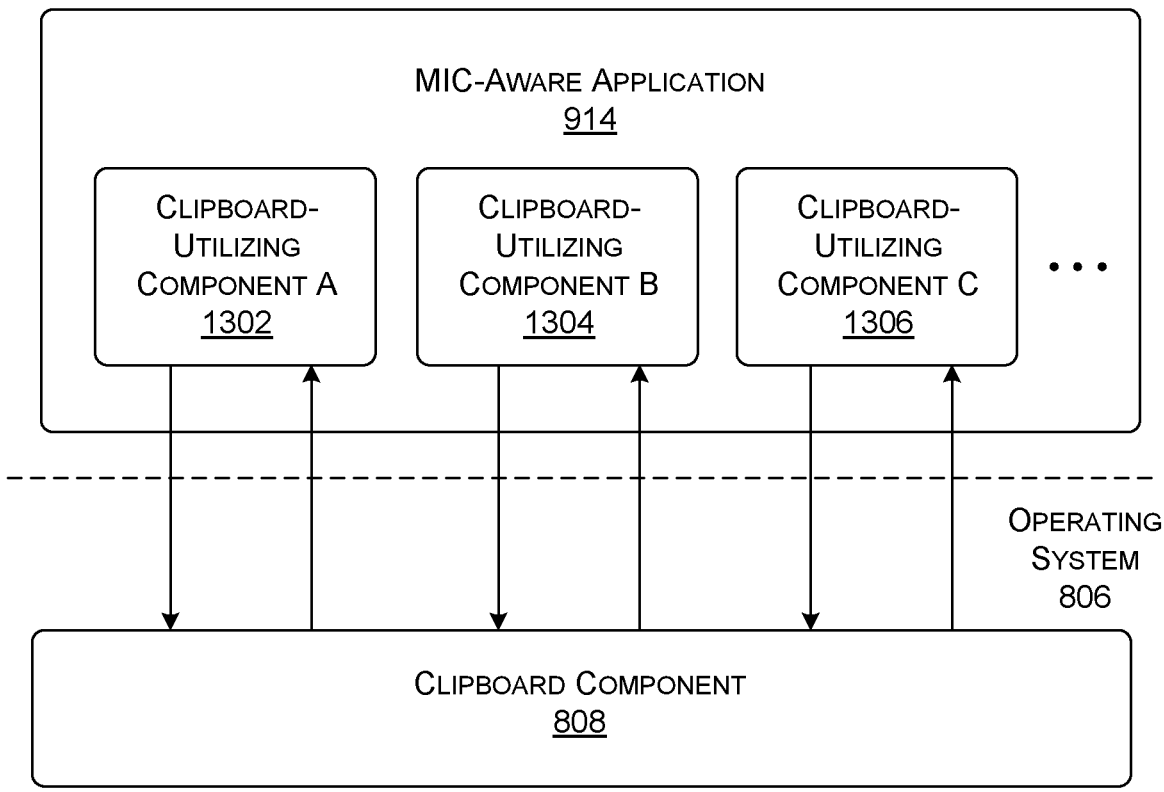
FIG. 13 is a signal diagram which shows how a multi-item-clipboard-aware (MIC-aware) application can leverage the clipboard component of FIG. 9 to perform a paste or a copy operation.

FIG. 13 is a signal diagram which shows how the multi-item-clipboard-aware (MIC-aware) application 914 can directly leverage the various features of the clipboard component 808 of FIG. 9. More specifically, the clipboard component 808 may provide various services described above, each associated with a different API. A developer of the MIC-aware application 914 can leverage any such clipboard service by using its API to access it. For example, the MIC-aware application 914 can include a clipboard-utilizing component A 1302 which interacts with a first clipboard service using a first API, a clipboard-utilizing component B 1304 which interacts with a second clipboard service using a second API, and a clipboard-utilizing component C 1306 which interacts with a third clipboard services using a third API. This approach is opposed to the strategy described in FIGS. 11 and 12, in which the legacy application 912, including legacy APIs, utilizes the services of the clipboard component 808 through the redirection provided by the input intercept component 910.

Without limitation, the clipboard component 808 can host the following services, each accessible via a particular API: (a) a service that provides a set of content items from the multi-item clipboard store 902 when requested by an application; (b) a service that provides a subset of content items of a particular type from the multi-item clipboard store 902 when requested by an application; (c) a service that adds one or more content items to the multi-item clipboard store 902 when requested by an application; (d) a service that provides one or more supplemental items for each content item that is provided via a copy operation, and so on. In addition, the clipboard component 808 can host any of the services described above with reference to FIG. 10; in this implementation, however, an application can directly interact with these services via respective APIs, rather than, or in addition to, using the particular UI strategy shown in FIG. 5. For example, an application can instruct the clipboard component 808 to store a content item in a particular copy mode by calling the clipboard component 808 using a particular MIC-aware copy API. That copy API can accept, as input parameters, the content item to be copied, and a parameter value which specifies a copy mode, and/or any other mode-specific parameter value(s).

Different MIC-aware applications can utilize information obtained from an API in different ways. For example, a first MIC-aware application can retrieve all of the content items from the multi-item clipboard store 902 by calling a particular API. That MIC-aware application can then use application-specific logic to generate an application-specific user interface presentation, which presents a visual representation of the content items. Another MIC-aware application can perform the same operation, but filter out a subset of content items based on any factor(s). For example, the MIC-aware application can remove those content items that serve no meaningful purpose with respect to the function performed by the MIC-aware application.

In some implementations, a developer of an MIC-aware application may choose to disable the interaction modes described in FIGS. 11 and 12. In other implementations, a developer of an MIC-aware application can allow the interaction modes described in FIGS. 11 and 12 to operate as described above, while providing additional functionality that leverages the enhanced MIC-aware APIs described above. In that situation, the developer can allow a user to access the content items of the multi-item clipboard store 902 via two or more access strategies. In still other cases, a developer can continue to exclusively use legacy copy and paste operations provided by legacy copy and paste APIs, effectively ignoring the enhanced MIC-aware APIs provided by the clipboard component 808. In that scenario, an end user can continue to interact with the multi-item clipboard store 902 using the approach described in FIGS. 11 and 12. In summary, a developer is provided with tools which empower him or her to create applications which leverage the clipboard component 808 to varying extents (including not at all), via various access strategies, to serve many different application objectives.

C. Representative Computing Functionality

Figure 14:
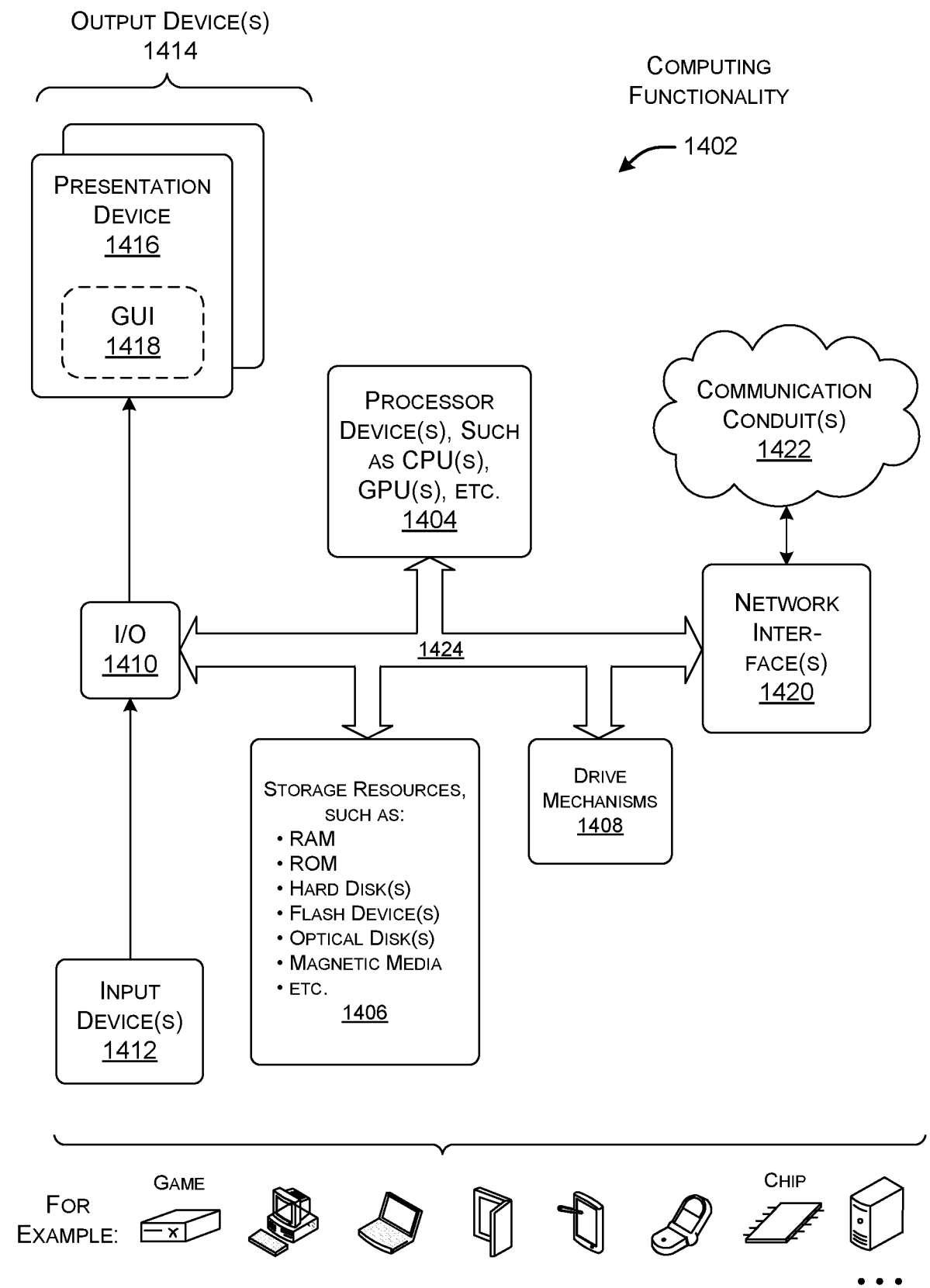
FIG. 14 shows illustrative computing functionality that can be used to implement any aspect of the features shown in the foregoing drawings.

FIG. 14 shows computing functionality 1402 that can be used to implement any aspect of the mechanisms set forth in the above-described figures. For instance, the type of computing functionality 1402 shown in FIG. 14 can be used to implement the local computing device 804 of FIG. 8. Generally note that the set of features described in FIG. 14 is illustrative, and that any particular manifestation of the computing functionality 1402 can omit one or more of the features shown in FIG. 14, and/or add one or more features that are not illustrated in FIG. 14. In all cases, the computing functionality 1402 represents one or more physical and tangible processing mechanisms.

The computing functionality 1402 can include one or more hardware processor devices 1404, such as one or more central processing units (CPUs), and/or one or more graphical processing units (GPUs), and so on. The computing functionality 1402 can also include any storage resources (also referred to as computer-readable storage media or computer-readable storage medium devices) 1406 for storing any kind of information, such as machine-readable instructions, settings, data, etc. Without limitation, for instance, the storage resources 1406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1402. The computing functionality 1402 also includes one or more drive mechanisms 1408 for interacting with any storage resource, such as a hard disk drive mechanism, an optical disk drive mechanism, and so on.

The computing functionality 1402 may perform any of the functions described above in Sections A and B when the hardware processor device(s) 1404 carry out computer-readable instructions stored in any storage resource or combination of storage resources. Further, the computing functionality 1402 can use any storage resource or combination of storage resources to store the multi-item clipboard store 902 shown in FIG. 9, or a single-item clipboard store.

The computing functionality 1402 also includes an input/output component 1410 for receiving various inputs (via input devices 1412), and for providing various outputs (via output devices 1414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), haptic input mechanism, and so on. One particular output mechanism may include a display device 1416 and an associated graphical user interface presentation (GUI) 1418. The clipboard component can present its various user interface presentations shown in the figures on the display device 1416. The display device 1416 may correspond to a charge-coupled display device, a cathode ray tube device, a projection mechanism, etc. The computing functionality 1402 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area computer network, a wide area computer network (e.g., the Internet), point-to-point connections, etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself The following summary provides a non-exhaustive list of illustrative aspects of the technology set forth herein.

According to a first aspect, a computing device is described herein which includes a clipboard component having at least a multi-item clipboard store and an input intercept component. The multi-item clipboard store stores one or more content items provided by one or more applications. The input intercept component is configured to: detect an option-selection event in response to interaction by a user with an input device, in course of interaction by the user with a particular application; in response to the option-selection event, instruct the clipboard component to perform a preparatory action; and send an application triggering signal to the particular application. The particular application is configured, in response to the application triggering signal, to interact with the clipboard component to perform a clipboard action.

According to a second aspect, the clipboard component is implemented by an operating system of the computing device.

According to a third aspect, the preparatory action corresponds to movement of a selected content item in the multi-item clipboard store to a particular position in the multi-item clipboard store. Further, the particular application performs the clipboard action by receiving the selected content item from the particular position, and pasting the selected content item into a target work item provided by the particular application.

According to a fourth aspect, the preparatory action corresponds to setting a particular copy mode from among a set of copy modes. The particular application performs the clipboard action by sending a selected content item to the clipboard component, upon which the clipboard component performs processing on the selected item in accordance with the particular copy mode that has been set.

According to a fifth aspect, the input intercept component is further configured to: detect a user interface (UI) activation event in response to interaction by the user with the input device; and, in response to the UI-activation event, invoke a multi-option user interface (UI) presentation.

According to a sixth aspect, the multi-option UI presentation provides a representation of one or more content items in the multi-item clipboard store.

According to a seventh aspect, the multi-option UI presentation provides a representation of one or more copy modes for copying a selected content item.

According to an eighth aspect, the input intercept component is configured to detect the UI-activation event in response to detecting that the user has activated at least a first input key and a second input key in a first prescribed manner.

According to a ninth aspect, the input intercept component is configured to detect the option-selection event in response to detecting that the user has activated the first input key and the second input key in a second prescribed manner.

According to a tenth aspect, the input intercept component is configured to detect the option-selection event by detecting that the user has chosen a selected content item in a multi-option user interface (UI) presentation. Further, the clipboard component is further configured to determine a target work item, corresponding to a work item that was in focus prior to engagement by the user with the multi-option UI presentation.

According to an eleventh aspect, a method is described, implemented by one or more computing devices, for interacting with a clipboard store. The method includes: detecting a user interface (UI) activation event in response to interaction by a user with an input device; presenting a multi-option user interface (UI) presentation in response to the UI-activation event; detecting an option-selection event in response to interaction by the user with the input device; selecting a particular option in the multi-option UI presentation in response to the option-selection event; and performing a particular clipboard action, corresponding to the particular option, that affects the clipboard store. The option-selection event is produced in response to actuation of a same set of user interface control mechanisms as the UI-activation event.

According to a twelfth aspect, the UI-activation event is detected by detecting that the user has activated at least a first input key and a second input key in a first prescribed manner. Further, the option-selection event is detected by detecting that the user has activated the first input key and the second input key in a second prescribed manner.

According to a thirteenth aspect, the method further includes, on another occasion, performing a default clipboard action in response to actuation by the user of the first input key and the second input key in a third prescribed manner. The third prescribed manner is distinguished from the first prescribed manner, at least in part, based on an amount of time that the user actuates at least one of the input keys.

According to a fourteenth aspect, the clipboard store is a multi-item clipboard store. Further, the multi-option UI presentation provides a representation of one or more content items in the multi-item clipboard store. Further, the particular option that is selected corresponds to a selected content item in the multi-item clipboard store. Further, the particular clipboard action corresponds to providing the selected content item to an application for pasting the selected content item into a target work item with which the user is interacting.

According to a fifteenth aspect, the multi-option UI presentation provides a representation of one or more copy modes for copying a selected content item. Further, the particular option that is selected corresponds to a selected copy mode for copying the selected content item. Further, the particular clipboard action corresponds to copying the selected content item in conformance with the selected copy mode.

According to a sixteenth aspect, the particular clipboard action involves transferring the selected content item to one or more target computing devices.

According to a seventeenth aspect, the particular clipboard action involves providing an invitation to share the selected content item via one or more target sharing systems.

According to an eighteenth aspect, the particular clipboard action involves storing the selected content item in the clipboard store such that the selected content item has one or more specified properties, each property governing a manner in which the clipboard store: retains the selected content item; and/or provides access to the selected content items.

According to a nineteenth aspect, a computer-readable storage medium for storing computer-readable instructions is described herein. The computer-readable instructions, when executed by one or more processor devices, perform a method that includes: on a first occasion, detecting a default clipboard event by detecting that a user has performed a default clipboard gesture; and in response to the default clipboard event, performing a default clipboard action. The method further includes, on a second occasion, detecting a user interface (UI) activation event by detecting that the user has performed a UI-activation gesture. The UI-activation gesture is distinguished from the default clipboard gesture, at least in part, based on an amount of time that the user actuates a user interface control mechanism. The method further includes: in response to the UI-activation event, presenting a multi-option user interface (UI) presentation; detecting an option-selection event in response to interaction by the user with the multi-option UI presentation; and selecting a particular option in the multi-option UI presentation in response to the option-selection event.

According to a twentieth aspect, the above-referenced detecting of the default clipboard event, the above-referenced detecting of the UI-activation event, and the above-referenced detecting of the option-selection event involve detecting that the user has activated a same set of user interface control mechanisms in different respective manners.

According to a twenty-first aspect, a method is described for copying a content item to a clipboard store. The method includes detecting a user interface (UI) activation event in response to interaction by a user with an input device. The method then includes presenting a multi-option user interface (UI) presentation in response to the UI-activation event. The multi-option UI presentation provides a representation of one or more copy modes for copying a selected content item. The method further includes detecting an option-selection event in response to interaction by the user with the input device, and selecting a particular option in the multi-option UI presentation in response to option-selection event. The particular option that is selected corresponds to a selected copy mode for copying the selected content item. The method further includes copying the selected content item in conformance with the selected copy mode.

According to a twenty-second aspect, a method is described for copying a content item to a clipboard store. The method includes receiving a selection by a user of a content item to be copied, corresponding to a selected content item. The user makes the selection via a first computing device. The method further includes determining, with reference to one or more rules and/or other logic, at least one communication channel to transfer the selected content item from the first computing device to at least a second computing device. The communication channel(s) that is chosen constitutes the selected communication channel(s). The method then transfers the selected content item to the second computing device, via the selected communication channel(s). The second computing device, upon receipt of the selected content item, can optionally store the selected item in its local clipboard store.

According to a twenty-third aspect, the selected communication channel(s) is chosen based on any combination of:

a size of the selected content item; a location of the second computing device relative to the first computing device; a performance of one or more of the communication channel(s), etc.

According to a twenty-fourth aspect, the selected communication channel(s) includes a first communication channel which is used to transfer metadata pertaining to the selected content item, and a second communication channel which is used to transfer content associated with the selected content item.

A twenty-fifth aspect corresponds to any combination (e.g., any logically compatible permutation or subset) of the above-referenced first through twenty-fourth aspects.

A twenty-sixth aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-fifth aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
   a processor device; and
   a storage resource storing machine-readable instructions which, when executed by the processor device, cause the processor device to:
   store one or more content items provided by one or more applications in a multi-item clipboard store, the one or more content items including a topmost content item in a topmost position of the multi-item clipboard store and another content item in another position of the multi-item clipboard store;
   detect a paste event in response to input from an input device, in course of interaction with a particular application that is configured call a programming interface associated with a single-item clipboard store, wherein the paste event selects the another content item stored in the another position of the multi-item clipboard store to paste into the particular application;
   in response to the paste event, perform a preparatory action to configure the multi-item clipboard store for use by the particular application, the preparatory action involving moving the another content item selected by the paste event to the topmost position of the multi-item clipboard store; and
   after the preparatory action, send an application triggering signal to the particular application that causes the particular application to interact with the multi-item clipboard store to perform a paste operation of the another content item using the programming interface associated with the single-item clipboard store.

2. The computing device of claim 1, wherein at least the preparatory action is implemented by an operating system of the computing device.

3. The computing device of claim 1,
   wherein the particular application performs the paste operation by receiving the another content item from the topmost position via the programming interface associated with the single-item clipboard store, and pasting the another content item into a target work item provided by the particular application.

4. The computing device of claim 1, wherein the machine-readable instructions, when executed by the processor device, cause the processor device to:
   detect a copy event in a course of interaction with the particular application;
   in response to the copy event, perform another preparatory action by setting a particular copy mode from among a set of copy modes; and
   send another application triggering signal to the particular application that causes the particular application to provide a selected content item to the multi-item clipboard store via another programming interface associated with the single-item clipboard store.

5. The computing device of claim 1, wherein the machine-readable instructions, when executed by the processor device, cause the processor device to:
   detect a user interface (UI-activation event in response to further input from the input device; and
   in response to the UI-activation event, invoke a multi-option user interface (UI) presentation,
   the paste event being received via interaction with the multi-option UI presentation.

6. The computing device of claim 5, wherein the multi-option UI presentation displays a representation of multiple content items in the multi-item clipboard store and the paste event selects the another content item from the displayed representation.

7. The computing device of claim 5, wherein the machine-readable instructions, when executed by the processor device, cause the processor device to:
   detect the UI-activation event in response to activation of at least a first input key and a second input key in a first prescribed manner.

8. The computing device of claim 7, wherein the machine-readable instructions, when executed by the processor device, cause the processor device to:
   detect the paste event in response to activation of the first input key and the second input key in a second prescribed manner.

9. The computing device of claim 1, wherein the machine-readable instructions, when executed by the processor device, cause the processor device to:
   detect the paste event by detecting a selection of the another content item from a multi-option user interface (UI) presentation;
   determine a target work item associated with the particular application that was in focus prior to selection of the another content item from the multi-option UI presentation; and
   cause the particular application to paste the another content item into the target work item.

10. The computing device of claim 1, wherein the another content item is located in a third position of the multi-item clipboard store prior to the paste event and the machine-readable instructions, when executed by the processor device, cause the processor device to:

automatically move the another content item from the third position to the topmost position in response to the paste event and in the absence of explicit reordering input from a user.

11. A method implemented by one or more computing devices, the method comprising:

storing a plurality of content items in a multi-item clipboard store, the plurality of content items including a topmost content item in a topmost position of the multi-item clipboard store and another content item in another position of the multi-item clipboard store;

detecting paste input from an input device received during interaction with a particular application that lacks programming interfaces designed for the multi-item clipboard store, wherein the paste input selects the another content item stored in the another position of the multi-item clipboard store to paste into the particular application;

responsive to the paste input selecting the another content item, automatically replacing the topmost content item in the topmost position of the multi-item clipboard store by moving the another content item to the topmost position of the multi-item clipboard store; and after moving the another content item from the another position to the topmost position of the multi-item clipboard store, sending an application triggering signal to the particular application, the application triggering signal causing the particular application to obtain the another content item from the topmost position of the multi-item clipboard store using a programming interface designed for a single-item clipboard store.

12. The method of claim 11, further comprising:

intercepting the paste input from the input device before the paste input is provided to the particular application.

13. The method of claim 11, further comprising:

detecting that the paste input involves a key press that lasts for longer than a prescribed amount of time;

responsive to the key press that lasts for longer than the prescribed amount of time, displaying a multi-option user interface that displays the plurality of content items; and detecting that the paste input further involves a selection of the another content item from the multi-option user interface.

14. The method of claim 11, further comprising:

detecting that the paste input involves a first key press of a first key and a second key press of a second key that each last for longer than a prescribed amount of time;

responsive to the first key press and the second key press, displaying a multi-option user interface that displays the plurality of content items;

detecting that the paste input further involves multiple subsequent key presses of the second key while the first key continues to be pressed; and iterating through the plurality of content items for each of the subsequent key presses until the another content item is reached.

15. The method of claim 14, further comprising:

detecting that the paste input further involves releasing the first key when the another content item has been reached; and replacing the topmost content item with the another content item responsive to the releasing of the first key.

16. A computer-readable storage media storing machine-readable instructions which, when executed by a processor device, cause the processor device to perform acts comprising:

storing a plurality of content items in a multi-item clipboard store, the plurality of content items including a topmost content item in a topmost position of the multi-item clipboard store, a second content item in a second position below the topmost position, and a third content item in a third position below the second position;

detecting a paste selection of the third content item from the multi-item clipboard store to paste into a particular application that is configured to call a programming interface designed for a single-item clipboard store;

responsive to the paste selection, automatically replacing the topmost content item in the multi-item clipboard store with the third content item by moving the third content item to the topmost position of the multi-item clipboard store; and after moving the third content item from the third position to the topmost position of the multi-item clipboard store, causing the particular application to obtain the third content item from the topmost position of the multi-item clipboard store using the programming interface designed for the single-item clipboard store.

17. The computer-readable storage media of claim 16, the acts further comprising:

receiving another selection of a particular copy mode for copying another content item from the particular application; and copying the another content item from the particular application according to the particular copy mode.

18. The computer-readable storage media of claim 17, the acts further comprising:

when the particular copy mode is a cross-device transfer mode, copying the another content item to a particular target computing device.

19. The computer-readable storage media of claim 17, the acts further comprising:

when the particular copy mode is a cross-device transfer mode, copying the another content item to multiple target computing devices.

20. The computer-readable storage media of claim 17, the acts further comprising:

when the particular copy mode is a concatenation mode, concatenating the another content item with a further content item that is present in the multi-item clipboard store.

21. The computer-readable storage media of claim 16, wherein the particular application is a legacy application.

* * * * *